(12) United States Patent
Kittaka et al.

(10) Patent No.: US 7,515,804 B2
(45) Date of Patent: Apr. 7, 2009

(54) OPTICAL WAVEGUIDE DEVICE

(75) Inventors: Shigeo Kittaka, Tokyo (JP); Keiji Tsunetomo, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 0 days.

(21) Appl. No.: 12/001,410

(22) Filed: Dec. 11, 2007

(65) Prior Publication Data

US 2008/0107388 A1 May 8, 2008

Related U.S. Application Data

(63) Continuation of application No. PCT/JP2007/052566, filed on Feb. 14, 2007.

(30) Foreign Application Priority Data

Feb. 23, 2006 (JP) .............. 2006-047335

(51) Int. Cl.
  G02B 6/10 (2006.01)
  G02B 6/26 (2006.01)
  G02B 6/42 (2006.01)
(52) U.S. Cl. .................... 385/131; 385/43; 385/129
(58) Field of Classification Search ............ 385/14, 385/43, 129, 131
See application file for complete search history.

(56) References Cited

U.S. PATENT DOCUMENTS

| 6,111,998 | A | 8/2000 | Ido et al. |
|---|---|---|---|
| 6,768,758 | B1 | 7/2004 | Hamamoto |
| 2005/0018734 | A1 | 1/2005 | Sugitatsu et al. |
| 2005/0147371 | A1 | 7/2005 | Noda et al. |
| 2005/0152656 | A1* | 7/2005 | Talneau et al. .............. 385/129 |
| 2006/0251368 | A1 | 11/2006 | Kittaka et al. |

FOREIGN PATENT DOCUMENTS

| JP | 1-105589 | 4/1989 |
|---|---|---|
| JP | 3-284892 | 12/1991 |
| JP | 8-153927 | 6/1996 |
| JP | 9-311233 | 12/1997 |
| JP | 10-73736 | 3/1998 |
| JP | 2000-323781 | 11/2000 |
| JP | 2001-133647 | 5/2001 |
| JP | 2001-135895 | 5/2001 |

(Continued)

OTHER PUBLICATIONS

Yariv, et al., "Coupled-resonator optical waveguide: a proposal and analysis", Optics Letters, vol. 24, No. 11, Jun. 1999, pp. 711-713.

(Continued)

Primary Examiner—Sung H Pak
Assistant Examiner—Daniel Petkovsek
(74) Attorney, Agent, or Firm—Hamre, Schumann, Mueller & Larson, P.C.

(57) ABSTRACT

An optical waveguide device $1a$ is configured to include a straight waveguide $2a$ and bottleneck portions $3a$ provided in two locations in the longitudinal direction of the waveguide $2a$. In the optical waveguide device $1a$, light confinement is implemented in all surfaces. This permits provision of an optical waveguide device, wherein a reflector or resonator can be provided in a waveguide using a simple configuration.

10 Claims, 18 Drawing Sheets

FOREIGN PATENT DOCUMENTS

| | | |
|---|---|---|
| JP | 2003-152273 | 5/2003 |
| JP | 2003-186068 | 7/2003 |
| JP | 2003-279765 | 10/2003 |
| JP | 2005-091925 | 4/2005 |
| JP | 2005-64471 | 10/2005 |
| WO | 2005/008305 | 1/2005 |
| WO | 2006/129501 | 12/2006 |

OTHER PUBLICATIONS

Lan, et al, "Design of impurity band-based photonic crystal waveguides and delay lines for ultrashort optical pulses", Journal of Applied Physics, vol. 90, No. 9, Nov. 2001, pp. 4321-4327.

Fukamachi, et al., "Group-Delay Properties of Coupled-Defect Structures in Photonic Crystals", Japanse Journal of Applied Physics, vol. 43, No. 4A, 2004, L449-L452.

\* cited by examiner (a)

(b)

OPTICAL WAVEGUIDE DEVICE

TECHNICAL FIELD

The present invention relates to an optical waveguide device used as a reflective device, a resonant device, etc.

BACKGROUND ART

Waveguides of the configuration, in which a high refractive index core portion is provided inside quartz or another vitreous material, already have been used in actual practice. In particular, thin silicon wire waveguides, in which a "thin silicon wire" made up of high refractive index silicon (Si) is used as the core, or defect waveguides (two-dimensional photonic crystal defect waveguides), in which two-dimensional photonic crystals are used, have recently attracted much interest and have been the subject of intensive research and development. The structure of a two-dimensional photonic crystal defect waveguide is described here. First of all, a two-dimensional photonic crystal having a two-dimensional periodic refractive index structure is formed, for example, by arranging regularly-spaced holes in a high refractive index thin-film layer made of Si. It should be noted that the two-dimensional photonic crystal is configured in such a manner that a complete photonic band gap in the operation frequency region is formed within a plane including a direction exhibiting refractive index periodicity (periodic refractive index direction). Furthermore, introducing line defects into this two-dimensional photonic crystal forms a defect waveguide. Light can propagate through the defect portion of such a defect waveguide, but cannot propagate through locations into which no defects have been introduced. Consequently, light entering the defect portion is confined in the defect portion and can propagate without leaking out.

Function devices utilizing the above-described waveguides include, for example, Bragg reflection devices. FIG. 16 is a plan view schematically illustrating Bragg reflection devices with a small refractive-index difference provided in a straight waveguide. In (a) of FIG. 16, a Bragg reflection portion 90 is provided by forming high refractive index portions 89 in a periodic fashion in a single location in the longitudinal direction of a waveguide 88. The Bragg reflection portion 90 then selectively reflects propagating light with a frequency corresponding to the period of the Bragg reflection portion 90. It should be noted that the high refractive index portions 89 can be formed using a well-known technique called "interference exposure", in which ultraviolet (UV) light is employed. Moreover, if, as shown in (b) of FIG. 16, Bragg reflection portions 92 are provided in two locations in the longitudinal direction of a waveguide 91, then a Fabry-Perot resonator can be formed, which resonates light of specific frequency components in the portion (resonant portion) that lies between the pair of Bragg reflection portions 92.

Furthermore, also known is a Fabry-Perot resonator wherein, as shown in FIG. 17, Bragg reflection portions 95 having holes 94 formed in a periodic fashion are provided in two locations in the longitudinal direction of a semiconductor waveguide 93 (for example, see JP 2003-186068A).

DISCLOSURE OF THE INVENTION

Problems to be Solved by the Invention

However, the problem with Bragg reflection devices having a small refractive-index difference, such as the ones shown in FIG. 16, is that the grating number of the Bragg reflection portion(s) needs to be increased in order to enhance reflectivity, and because the Bragg reflection portion(s) is made longer, miniaturization becomes more difficult to accomplish. Moreover, processes such as interference exposure become necessary as well. Furthermore, the problem with Bragg reflection devices utilizing semiconductor waveguides, such as the one shown in FIG. 17, is that the width of the high refractive index semiconductor waveguide is as narrow as 0.2-0.4 µm, which renders the holes extremely small and makes fabrication difficult.

The present invention has been made to solve the above-described problems in the prior art and it is an object of the present invention to present an optical waveguide device, wherein a reflector or resonator can be provided in a waveguide using a simple configuration.

Means for Solving the Problems

In order to achieve the above-mentioned object, a configuration of an optical waveguide device of the present invention includes a linear waveguide and a bottleneck portion(s) formed by locally narrowing the width of the waveguide. The waveguide has a core that is composed of a one-dimensional photonic crystal exhibiting refractive index periodicity in one direction and permits propagation of electro-magnetic waves in directions that do not exhibit the refractive index periodicity.

With this configuration of the optical waveguide device, for example, it is possible to realize a reflector by using a simple configuration, wherein the side surface of a waveguide is furnished with a bottleneck portion(s).

In the optical waveguide device of the above-described configuration according to the present invention, it is preferable that the bottleneck portion is provided in a single location in the longitudinal direction of the waveguide.

Moreover, in the optical waveguide device of the above-described configuration according to the present invention, it is preferable that electro-magnetic waves are partially reflected by the bottleneck portion(s).

Moreover, in the optical waveguide device of the above-described configuration according to the present invention, it is preferable that the bottleneck portions are provided in two locations in the longitudinal direction of the waveguide, with electro-magnetic waves of specific frequency components resonated therebetween. With this preferred example, it is possible to realize a Fabry-Perot resonator by using a simple configuration.

Moreover, in the optical waveguide device of the above-described configuration according to the present invention, it is preferable that the bottleneck portions are provided in a periodic fashion in the longitudinal direction of the waveguide. With this preferred example, it is possible to realize a dispersion-compensating coupled resonant device by using a simple configuration.

Moreover, in the optical waveguide device of the above-described configuration according to the present invention, it is preferable that a reflective layer covers the bottleneck portion(s).

Moreover, in the optical waveguide device of the above-described configuration according to the present invention, it is preferable that frequency characteristics are changed by locally varying the temperature of the bottleneck portion(s). Moreover, in such a case, it is preferable that temperature controller for varying the temperature of the bottleneck portion(s) are heating with heaters or optical irradiation.

Moreover, in the optical waveguide device of the above-described configuration according to the present invention, it is preferable that the bottleneck portion(s) is composed of substances possessing non-linear characteristics and its optical characteristics are changed by external application of optical irradiation, electric fields, or magnetic fields to the bottleneck portion(s).

Moreover, in the optical waveguide device of the above-described configuration according to the present invention, it is preferable that the core, along with being made up of a multilayer film provided on a substrate and exhibiting refractive index periodicity across the thickness of the substrate, allows electro-magnetic waves to propagate by using the photonic band present on a Brillouin zone boundary in a direction perpendicular to the direction exhibiting the refractive index periodicity, and satisfies the condition:

$$a/\lambda_0 < 1/(2n_s),$$

where $n_s$ is the refractive index of a medium in contact with the side surfaces of the core that are parallel to the direction of the refractive index periodicity, a is the refractive index period of the core, and $\lambda_0$ is the wavelength, in vacuum, of the electro-magnetic waves propagating through the core. With this preferred example, the side surfaces of the waveguide and the peripheral surface of the bottleneck portion(s) can be used as perfect reflective surfaces possessing a reflectivity of 100% for propagating light.

EFFECTS OF THE INVENTION

The present invention provides a reflector or resonator in a waveguide by using a simple configuration, and therefore, makes it possible to realize an integrated optical device.

BEST MODE FOR CARRYING OUT THE INVENTION

Below, the present invention is explained more specifically with reference to embodiments.

Figure 1:
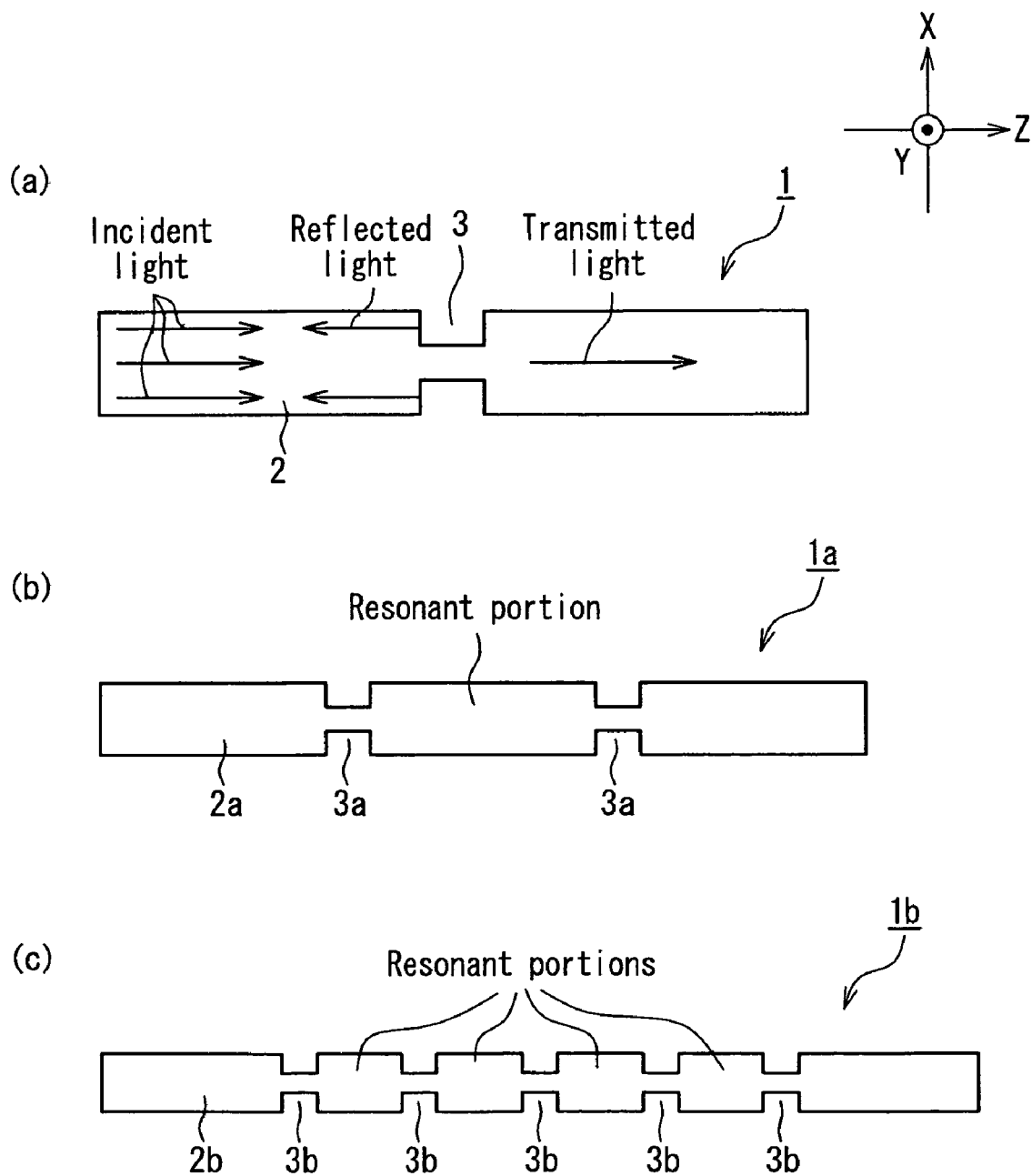
FIG. 1 is a plan view schematically illustrating optical waveguide devices according to an embodiment of the present invention, in which FIG. 1(*a*) shows a reflector, FIG. 1(*b*) shows a Fabry-Perot resonator, and FIG. 1(*c*) shows a coupled resonant device.

FIG. 1 is a plan view schematically illustrating optical waveguide devices according to an embodiment of the present invention. In FIG. 1, the propagation direction of light (electro-magnetic wave) is taken to be the Z-axis direction, and the directions perpendicular to the propagation direction of light (Z-axis direction) are taken to be the X-axis direction and the Y-axis direction, which also are perpendicular to each other.

The optical waveguide devices of the present embodiment include a line-shaped waveguide and a bottleneck portion(s) formed by locally narrowing the width of the waveguide. Here, the side surfaces of the waveguide (surfaces parallel to the YZ plane) are reflective surfaces with a reflectivity of 100% for light propagating in all directions within the XZ plane. In other words, propagating light is completely confined inside the side surfaces of the waveguide and cannot escape. Below, side surfaces exhibiting such characteristics are called "perfect reflective surfaces". A waveguide possessing such perfect reflective surfaces can be realized by using the two-dimensional photonic crystal defect waveguide, a one-dimensional photonic crystal waveguide, to be explained below, or a three-dimensional photonic crystal defect waveguide possessing a complete band gap for all directions. It should be noted that in an ordinary waveguide utilizing refractive-index difference-based total reflection, confinement of light beams incident at angles equal to or smaller than a critical angle is insufficient, which results in increased optical losses in the bottleneck portion(s).

More specifically, the optical waveguide device 1 illustrated in FIG. 1(*a*) includes a straight waveguide 2 and a rectangular bottleneck portion 3 provided in a single location in the longitudinal direction of the waveguide 2 (bottleneck-type device obtained by locally narrowing the width of the waveguide 2). Incident light (electro-magnetic waves) that is incident upon the optical waveguide device 1 is impeded partially in its propagation and split into reflected light and transmitted light. In other words, the optical waveguide device 1 illustrated in FIG. 1(*a*) operates as a reflective device partially reflecting the incident light. It should be noted that while optical losses tend to occur easily if a sharply defined bottleneck portion is provided in an ordinary waveguide, in case of a waveguide possessing the above-described "perfect reflective surfaces", the incident light can be split into reflected light and transmitted light while keeping optical losses to a minimum. Quite naturally, the thinner the bottleneck portion is made, the higher the reflectivity becomes. Moreover, the optical waveguide device (reflector) 1 illustrated in FIG. 1(*a*) can produce a nearly constant reflectivity over a wide wavelength region (or frequency band), with the reflectivity being adjustable by changing the width and length of the bottleneck portion 3. Therefore, this optical waveguide device (reflector) 1 can be used to make a Fabry-Perot resonator, such as the one shown in FIG. 1(*b*), or a coupled resonant device, such as the one illustrated in FIG. 1(*c*).

Figure 16:
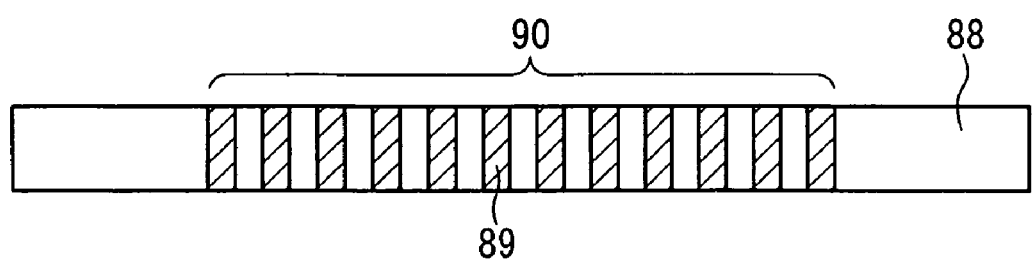
FIG. 16 is a plan view schematically illustrating conventional Bragg reflection devices with a small refractive index difference provided in a waveguide, in which FIG. 16 (*a*) shows a reflector and FIG. 16 (*b*) shows a Fabry-Perot resonator.
Figure 16:
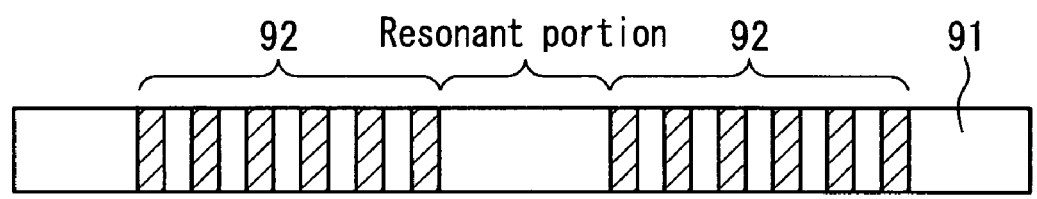
Figure 17:
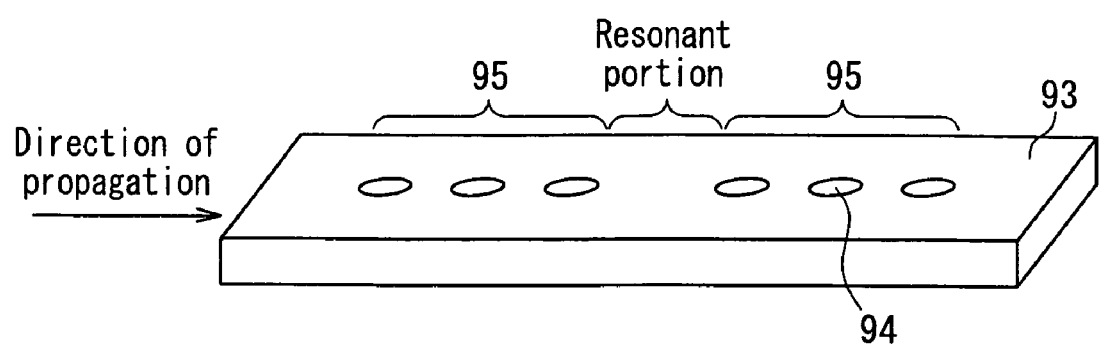
FIG. 17 is a perspective view schematically illustrating a conventional Fabry-Perot resonator, in which a semiconductor waveguide is employed.

Moreover, the optical waveguide device 1*a* illustrated in FIG. 1(*b*) includes a straight waveguide 2*a* and bottleneck portions 3*a* provided in two locations in the longitudinal direction of the waveguide 2*a*. As a result of such a configuration, the optical waveguide device 1*a* can operate as a Fabry-Perot resonator having reflectors (bottleneck portions 3*a*) in two locations in the longitudinal direction of the waveguide 2*a*. The portion of the waveguide 2*a* that is sandwiched between the reflectors (bottleneck portions 3*a*) serves as a cavity, with resonance occurring when the length of this portion is an integer multiple of one-half wavelength of the propagating light. Since the reflectors of the Fabry-Perot resonator require high reflectivity, Bragg reflectors utilizing the periodic structures shown in FIG. 16 and FIG. 17 or dielectric multilayer films are commonly used as these reflectors. The configuration of the present embodiment, however, makes it possible to realize an optical waveguide device 1*a* operating as a Fabry-Perot resonator by using a simple configuration.

Moreover, the optical waveguide device 1*b* illustrated in FIG. 1(*c*) includes a straight waveguide 2*b* and bottleneck portions 3*a* provided in a periodic fashion in the longitudinal direction of the waveguide 2*b*.

The optical waveguide device 1*b* is a coupled resonator obtained by aligning, side by side, multiple Fabry-Perot resonators illustrated in FIG. 1(*b*). The theory and characteristics of coupled resonant devices are described in detail, for example, in "OPTICS LETTERS, vol. 24, No. 11, p. 711 (1999)".

Coupled resonant devices, along with ensuring a certain transmission band, can achieve extremely high group velocity dispersion in this band, and, as a result, have been suggested for use as dispersion-compensating devices utilized in modifying pulse signals in optical communications. It should be noted that, according to the "JOURNAL OF APPLIED PHYSICS, vol. 90, No. 9, pp. 4321-4327 (2001)" or "Japanese Journal of Applied Physics, vol. 43, No. 4A, pp. L449-L452 (2004)", dispersion-compensating coupled resonant devices have been realized with dielectric multilayer films.

Also contemplated is the possibility of changing frequency characteristics by locally varying the temperature of the bottleneck portions in the reflector and resonator illustrated in FIG. 1(*a*) and FIG. 1(*b*). Moreover, also contemplated is the possibility of forming the bottleneck portion(s) from substances that possess non-linear characteristics and includes rare-earth elements and quantum dots and changing their optical characteristics by external application of optical irradiation, electric fields, or magnetic fields to the bottleneck portion(s).

It should be noted that the shape of the bottleneck portion (s) is not limited to the rectangular shape, and may be, for example, a triangular shape, or a shape having rounded corners in order to reduce losses, etc.

In addition, although straight waveguides 2, 2*a*, 2*b* are shown in the configuration of FIG. 1, the waveguide used in the present invention may be a curved waveguide, as long as it is a linear waveguide.

The waveguide provided with the above-described reflector, Fabry-Perot resonator, or coupled resonant device suitably is a channel-type waveguide that is provided on a substrate and makes use of a one-dimensional photonic crystal exhibiting refractive index periodicity in the Y-axis direction (across the thickness of the substrate) as the core. This waveguide is explained below.

Figure 2A:
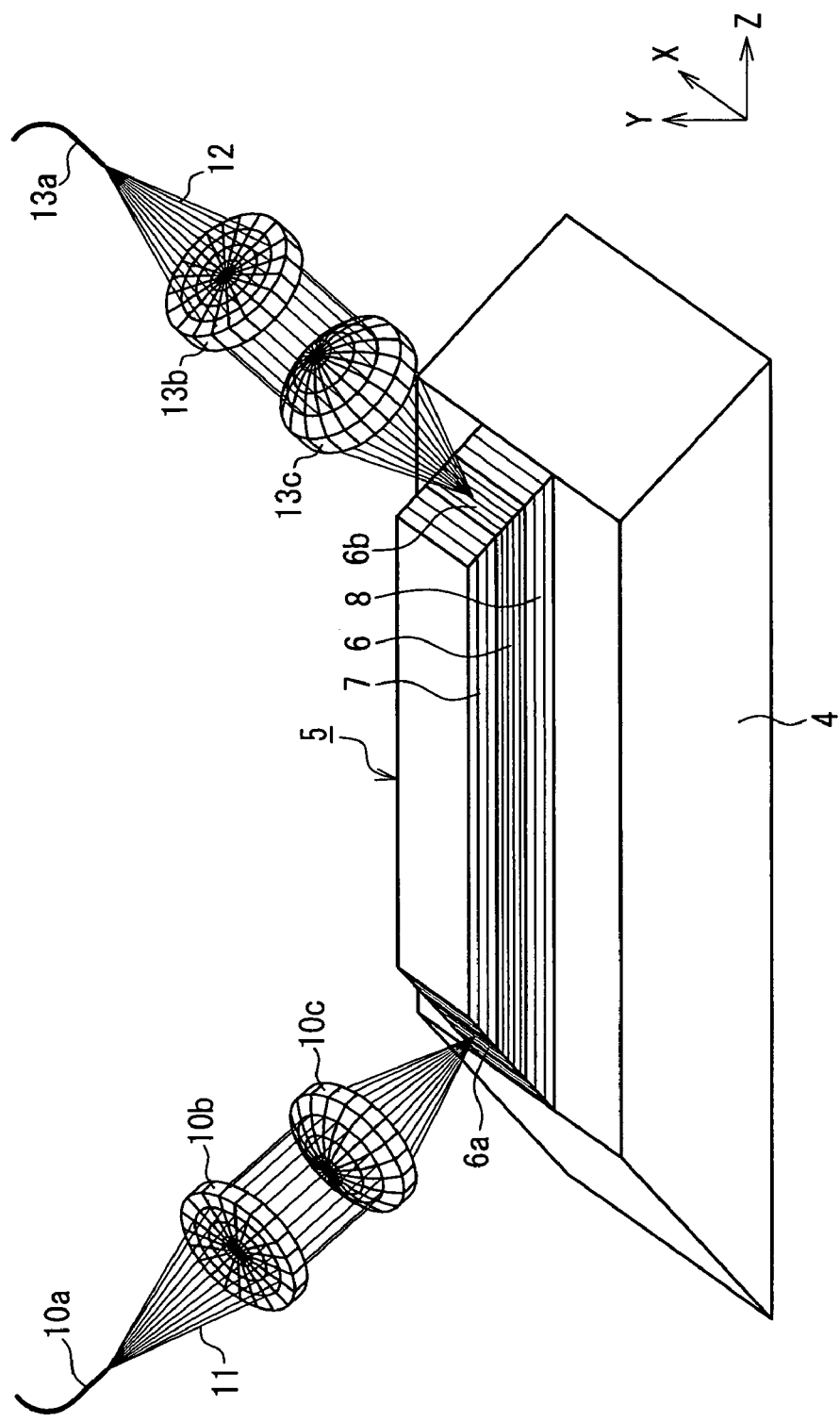
FIG. 2A is a perspective view schematically illustrating the configuration of a photonic crystal waveguide according to an embodiment of the present invention, which has a core and claddings made up of one-dimensional photonic crystals.
Figure 2B:
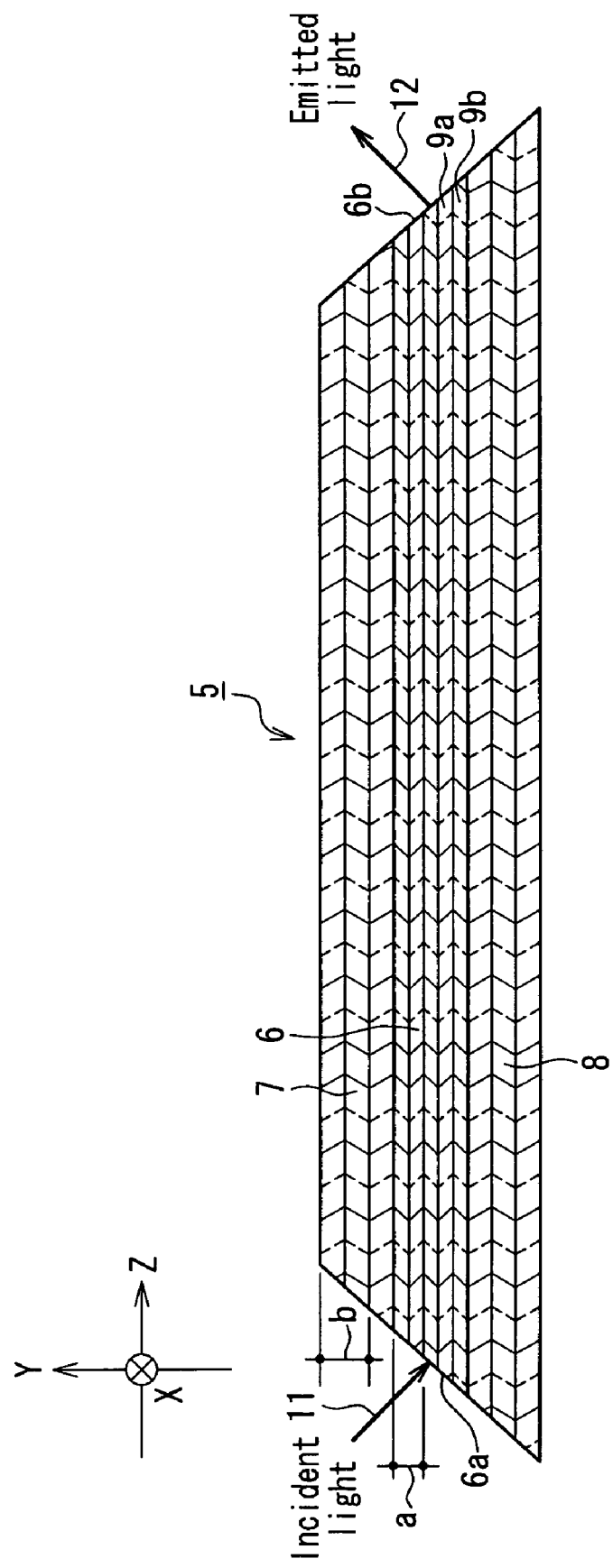
FIG. 2B is a cross-sectional view schematically illustrating the configuration of a photonic crystal waveguide according to an embodiment of the present invention, which has a core and claddings made up of one-dimensional photonic crystals.

FIG. 2 is a schematic diagram illustrating the configuration of a photonic crystal waveguide used in an embodiment of the present invention, which has a core and claddings made up of one-dimensional photonic crystals, with FIG. 2A being a perspective view and FIG. 2B being a cross-sectional view. As shown in FIG. 2A and FIG. 2B, the photonic crystal waveguide 5 is provided on a substrate 4. The photonic crystal waveguide 5 is composed of a core 6, which is made up of a one-dimensional photonic crystal exhibiting refractive index periodicity in the Y-axis direction (across the thickness of the substrate 4), and claddings 7, 8, which are provided so as to sandwich the core 6 in the vertical direction (Y-axis direction) and are made up of one-dimensional photonic crystals similarly exhibiting refractive index periodicity in the Y-axis direction (across the thickness of the substrate 4). The core 6 is made up of a dielectric multilayer film formed as a result of layers of substance 9*a* and substance 9*b* being alternately stacked in a periodic fashion in the Y-axis direction. Here, the thickness and refractive indices of the substance 9*a* and substance 9*b* are different, with the period (refractive index period), according to which the substance 9*a* and substance 9*b* are stacked, denoted as a. The claddings 7, 8 are made up of dielectric multilayer films formed by alternately stacking layers of the same substances as in core 6 in a periodic fashion in the Y-axis direction. It should be noted that the period (refractive index period) b, as well as the thickness of the layers of the claddings 7, 8 are different from the period a of the core 6.

The both end faces in the longitudinal direction (Z-axis direction) of the photonic crystal waveguide 5 are polished surfaces cut off obliquely. Incident light 11, which propagates through an optical fiber 10*a*, is collimated into parallel light by a collimator lens 10*b* and subsequently focused by an objective lens 10*c* and launched into the core 6 through an entrance end face 6*a* of the core 6. The propagating light, which propagates through the core 6 in the Z-axis direction, is emitted from the exit end face 6b of the core 6 as emitted light 12. After successively passing through an objective lens 13c and a collimator lens 13b, the emitted light 12 is made incident upon an optical fiber 13a.

Desirably, the light that propagates through the core 6 propagates with the mode on the Brillouin zone boundary in the photonic band structure, thereby permitting the waveguide device to operate as a light control device.

Figure 3:
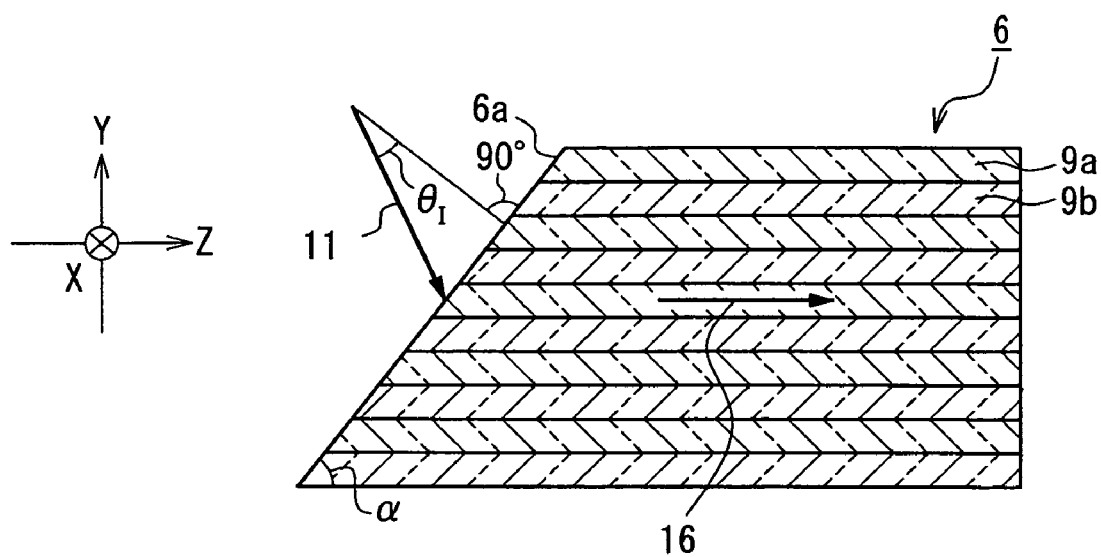
FIG. 3 is a cross-sectional view of a core made up of a one-dimensional photonic crystal, used to explain a method utilized in an embodiment of the present invention, in which an oblique entrance end face is employed to realize propagation on the Brillouin zone boundary.
Figure 4:
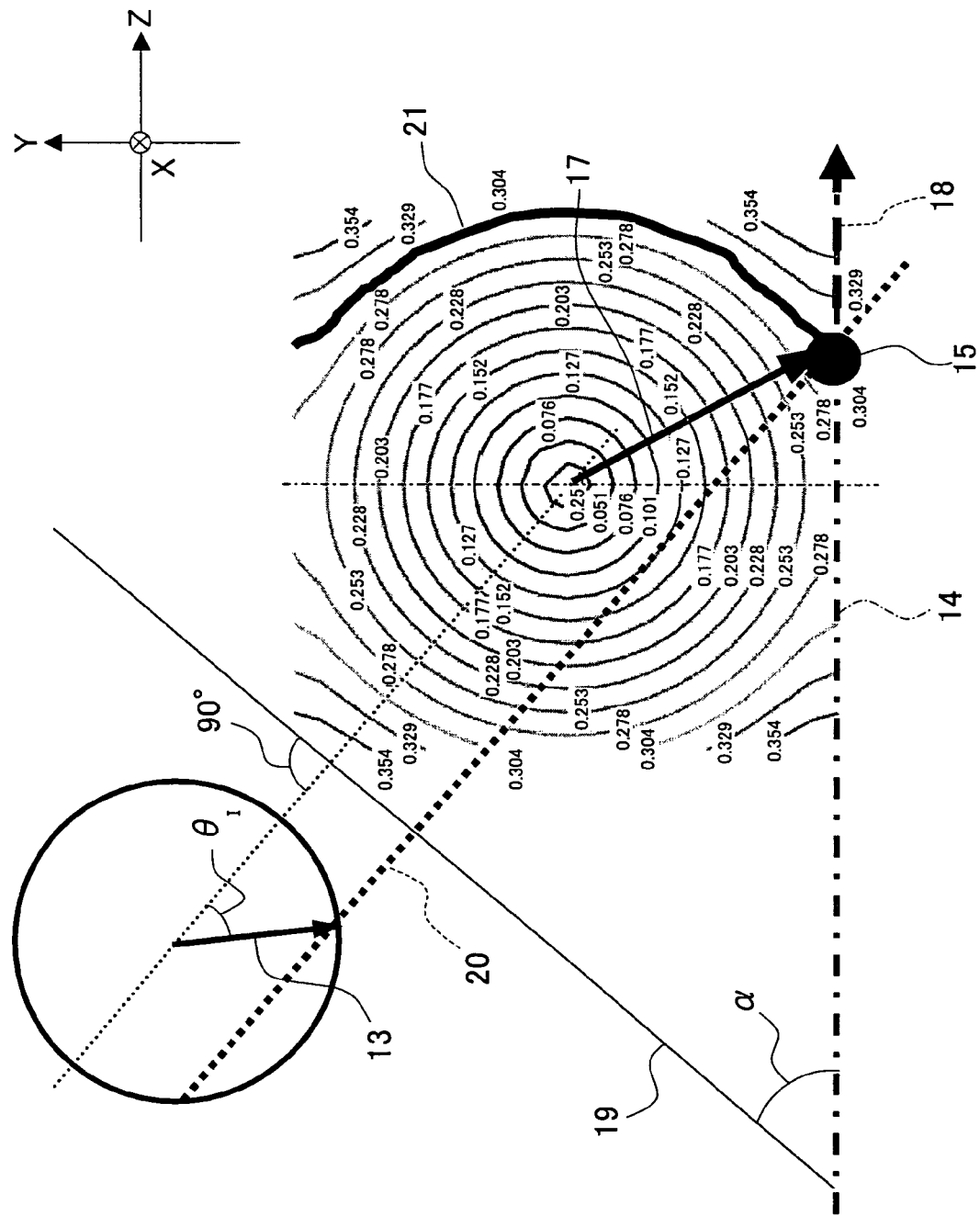
FIG. 4 is a photonic band diagram explaining a method according to an embodiment of the present invention, in which an oblique entrance end face is employed to realize propagation on the Brillouin zone boundary.

Using an entrance end face cut off obliquely as shown in FIG. 2A and FIG. 2B makes it possible to realize propagation on the Brillouin zone boundary. This is explained below with reference to FIG. 3 and FIG. 4. FIG. 3 is a cross-sectional view of a core made up of a one-dimensional photonic crystal, used to explain a method utilized in an embodiment of the present invention, in which an oblique entrance end face is employed to realize propagation on the Brillouin zone boundary, and FIG. 4 is a band diagram explaining this method. It should be noted that the band diagram of FIG. 4 shows the first photonic band.

As shown in FIG. 3, the core 6, which is made up of a one-dimensional photonic crystal with an oblique entrance end face 6a, is formed by alternately stacking layers of substance 9a and substance 9b in the Y-axis direction. The entrance end face 6a is tilted at an angle (tilt angle) of a with respect to the XZ plane. Incident light 11 is incident upon the entrance end face 6a at an incident angle $\theta_I$. The incident angle $\theta_I$ is the angle between a direction perpendicular to the entrance end face 6a (normal direction) and the direction in which the incident light 11 travels. It should be noted that all of the above-mentioned angles are determined in the YZ plane.

FIG. 4 is a band diagram describing propagation of light through the core 6 (see FIG. 3), which is made up of a one-dimensional photonic crystal and has an oblique entrance end face 6a, and, as can be seen from FIG. 4, the core 6 made up of such a one-dimensional photonic crystal with an oblique entrance end face 6a permits propagation on the Brillouin zone boundary.

In FIG. 4, the points at which the value of the normalized frequency $\omega a/2\pi c$ is the same are connected, so that they are shown as contour lines. Below, these contour lines are referred to as "equal-frequency lines". The numbers marking these lines indicate the value of the normalized frequency $\omega a/2\pi c$. It should be noted that the normalized frequency $\omega a/2\pi c$ is expressed using the angular frequency $\omega$ of the incident light 11, the period (refractive index period) a of the core 6 made up of a one-dimensional photonic crystal, and the speed of light c in vacuum. Moreover, using the wavelength $\lambda_0$ of the incident light 11 in vacuum, the normalized frequency can be represented as $a/\lambda_0$. Below, the normalized frequency is denoted simply as $a/\lambda_0$. In FIG. 4, the wave vector of the incident light 11 is represented by arrow 13. Moreover, on the Brillouin zone boundary 14, there lies a correspondence point 15 of the first band, where it coincides with an equal-frequency line 21 showing the normalized frequency $a/\lambda_0$ of the incident light 11. The wave vector of the propagating light 16 (see FIG. 3) is represented by arrow 17. In addition, the direction in which the energy of the propagating light 16 advances is represented by arrow 18. Moreover, the correspondence point 15 is on a normal 20 to face 19, which corresponds to the entrance end face 6a.

In the core 6, which is made up of a one-dimensional photonic crystal having its entrance end face 6a tilted relative to the direction of propagation of the propagating light 16, propagation on the Brillouin zone boundary 14 is made possible by adjusting the tilt angle α and the incident angle $\theta_I$ as shown in FIG. 4.

Figure 5:
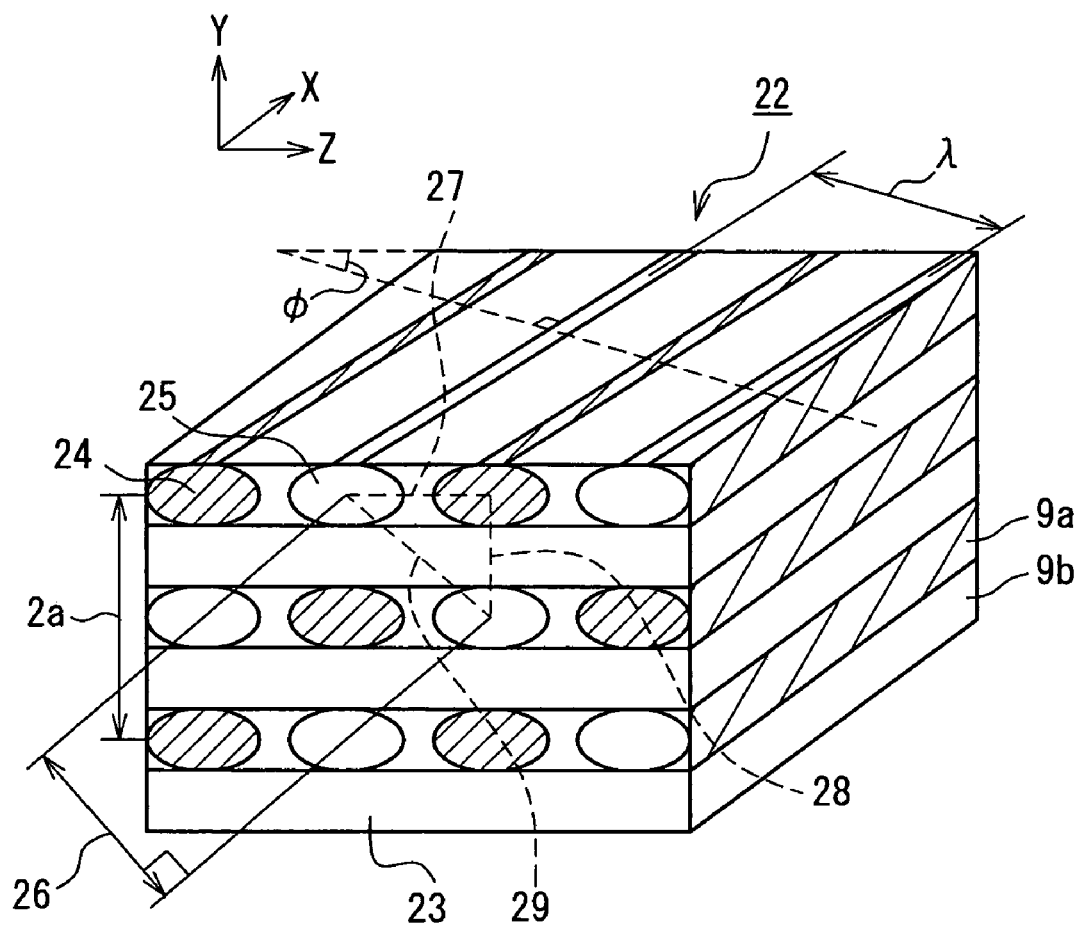
FIG. 5 is a schematic diagram illustrating an electric field produced when propagating light travels obliquely to the Z-axis direction through a one-dimensional photonic crystal according to an embodiment of the present invention.

Next, the confinement of light in the photonic crystal waveguide illustrated in FIG. 2A and FIG. 2B will be explained with reference to FIG. 2A, FIG. 2B, and FIG. 5. FIG. 5 is a schematic diagram illustrating an electric field produced when propagating light travels obliquely to the Z-axis direction through the one-dimensional photonic crystal.

First of all, explanations will be provided regarding light confinement condition for the purpose of preventing light from leaking from the side surfaces (side surfaces parallel to the YZ plane) in the direction of a plane perpendicular to the direction exhibiting the refractive index periodicity of the core 6 made up of a one-dimensional photonic crystal. By way of explanation, consider a case in which propagating light travels through a one-dimensional photonic crystal 22 that makes up the core 6 in a direction inclined at an angle $\phi$ with respect to the Z-axis direction within the XZ plane. As shown in FIG. 5, an electric field pattern shown as a checkered pattern is generated on a side surface (side surface parallel to the YZ plane) 23, on which the periodic structure of the one-dimensional photonic crystal 22 is exposed, in the case where the propagating light travels through the one-dimensional photonic crystal 22 in a direction inclined with respect to the Z-axis direction within the XZ plane. Specifically, FIG. 5 shows crests 24 of the electric field and troughs 25 of the electric field. It should be noted that the medium serving as a cladding, not shown, which is present on the side surfaces of the one-dimensional photonic crystal 22, is a homogeneous medium (air (refractive index: 1) in the case of FIG. 2A and FIG. 2B) with a uniform refractive index of $n_s$. Thus, the side surface 23 on which the periodic structure of the one-dimensional photonic crystal 22 is exposed is in contact with a homogeneous medium possessing a refractive index of $n_s$.

The characteristics of the electric field will be explained using the period a of the one-dimensional photonic crystal 22. As shown in FIG. 5, on the side surface 23, on which the periodic structure is exposed and which is in contact with the homogenous medium, a wave front having a period 26 is generated on the homogeneous medium side. This wave can turn into leakage light. In FIG. 5, a right-angled triangle is formed from mutually perpendicular additional lines 27, 28 and an additional line 29 (hypotenuse), with the length of the additional lines 27, 28 being, respectively, $\lambda/2 \cos \phi$ and a, which makes it possible to determine the length of the additional line 29 and, based on that, readily determine the magnitude (length) of the period 26. Here, λ is the period of the propagation mode in a direction perpendicular to the Y-axis direction.

Namely, the magnitude of the period 26 specifically is represented by:

$$a(\lambda/\cos \phi)/\{(\lambda/2 \cos \phi)^2 + a^2\}^{0.5}.$$

Therefore, if the magnitude of the period 26 is greater than the wavelength $\lambda_0/n_s$ in a homogeneous medium with a refractive index of $n_s$, such a wave turns into leakage light. Thus, the condition required to prevent light propagating through the homogenous medium with a refractive index of $n_s$ from leaking from the side surfaces parallel to the YZ plane of the one-dimensional photonic crystal 22 is to satisfy the inequality:

$$\lambda_0/n_s > a(\lambda/\cos \phi)/\{(\lambda/2 \cos \phi)^2 + a^2\}^{0.5}.$$

Moreover, the magnitude of the period 26 reaches a maximum value of 2a when the angle $\phi$ is 90°. In other words, if the following expression (1) is satisfied, no leakage light will be generated regardless of the value of the angle $\phi$.

$$\lambda_0/n_s > 2a \tag{1}$$

By transforming the above-mentioned expression (1) into an expression including the normalized frequency $a/\lambda_0$, the following expression (2) is obtained:

$$a/\lambda_0 < 1/(2n_s) \qquad (2)$$

Therefore, if the above-mentioned expression (2) is satisfied, light is in a state of perfect confinement by the side surfaces parallel to the Y-axis of the one-dimensional photonic crystal 22 and even if the propagating light is bent at a sharp angle, no light will leak outside the one-dimensional photonic crystal 22. In other words, the side surfaces parallel to the Y-axis of the one-dimensional photonic crystal 22 act as perfect reflective surfaces.

Next, explanations will be provided regarding light confinement within a plane perpendicular to the direction exhibiting the refractive index periodicity of the core 6 made up of a one-dimensional photonic crystal. In other words, explanations will be provided regarding light confinement in the vertical direction (Y-axis direction) of the core 6, i.e. light confinement within a plane parallel to the XZ plane of the core 6.

For example, if a medium whose refractive index is smaller than the effective refractive index of this one-dimensional photonic crystal, i.e. the value represented by $\lambda_0/\lambda$, wherein $\lambda$ is the $\lambda$ of FIG. 5, is placed in contact with the top and bottom faces of the core 6 made up of a one-dimensional photonic crystal, then, as a result of the difference in their refractive indices, light will be confined inside the core 6 made up of a one-dimensional photonic crystal. In order to realize refractive index difference-based light confinement, the effective refractive index of the one-dimensional photonic crystal that makes up the core 6 for the propagating light should be of a certain magnitude.

Light confinement can be implemented by making the effective refractive index higher than the refractive index of the medium placed in contact with the top and bottom faces of the core 6, e.g. higher than the refractive index of air (refractive index: 1) or low refractive index glass (e.g. quartz glass with a refractive index of 1.45). However, the problem is that when the effective refractive index is increased, effects such as "large wavelength-dependent changes in the effective refractive index" and "group velocity anomalies", which constitute important characteristics of photonic crystal waveguides, will be diminished.

Photonic band gap-based confinement, as shown in FIG. 2A and FIG. 2B, is an effective way to achieve adequate light confinement and produce effects such as the "large wavelength-dependent changes in the effective refractive index" and "group velocity anomalies", which constitute important characteristics of photonic crystal waveguides. Photonic band gap-based confinement of light in the vertical direction (Y-axis direction) of the core 6 is explained below.

Light that propagates through the core 6 made up of a one-dimensional photonic crystal can be prevented from propagating in the claddings 7, 8 through the use of a photonic band gap, and, specifically, simply by adjusting the period (refractive index period) a of the core 6 and the period (refractive index period) b of the claddings 7, 8.

Moreover, the ratio of the thicknesses of the substances constituting the photonic crystal may be changed by setting the period a and period b to equal values (see WO 2005/008305 A1).

Because the photonic crystal waveguide 5, as mentioned above, can realize perfect light confinement and has no limitations on its size or shape, a high degree of freedom in design can be achieved when it is used in the fabrication of optical waveguide device. In addition, due to its multilayer structure, the photonic crystal waveguide 5 can be fabricated readily as well. For example, optical waveguide device 1, 1a, and 1b operating as reflectors, Fabry-Perot resonators, and coupled resonant devices as shown in FIG. 1, in which light confinement is realized in all surfaces, can be fabricated readily by depositing a multilayer film on a substrate, forming masks in the waveguide portion and bottleneck portions, and conducting etching.

Materials suitable as the material of the multilayer film used in the one-dimensional photonic crystal waveguide 5 include materials commonly employed as thin film materials, such as, for example, silica ($SiO_2$), silicon, titanium oxide, tantalum oxide ($Ta_2O_5$), niobium oxide, magnesium fluoride, silicon nitride, and other materials of superior durability and film-forming cost. Thin films can be produced easily from these materials by ordinary methods, such as sputtering, vacuum deposition, ion assisted deposition, plasma CVD, etc. Among them, silica and tantalum oxide are a preferred combination because of the characteristics both have, such as their high optical transmissivity, the fact that they permit formation of homogeneous films without grain boundaries, etc., and allow for end faces to be polished using the same methods as those used in case of glass.

Moreover, when a one-dimensional photonic crystal waveguide 5 is formed on a substrate 4, there are no particular limitations concerning the material of the substrate 4, and it is possible to use substrates made up of ordinary quartz and silicon. Based on appropriate material selection, the operation of the one-dimensional photonic crystal waveguide 5 is made possible over a wavelength range of from about 200 nm to 20 µm, i.e. the commonly used light wavelength region.

Moreover, in the one-dimensional photonic crystal waveguide 5, the size of the entrance end face and exit end face can be made as large as, for example, 5 µm×5 µm. Therefore, the coupling efficiency can be raised by matching the mode field diameter of the end faces of the one-dimensional photonic crystal waveguide 5 and the optical fiber using an optical system with an objective lens and a collimator lens.

It should be noted that while the present embodiment has been explained using the example of optical waveguide devices (reflectors, Fabry-Perot resonators, coupled resonant devices, etc.) fabricated from one-dimensional photonic crystal waveguides providing perfect light confinement, these optical waveguide devices can be fabricated using defect waveguides formed by introducing line defects into two-dimensional or three-dimensional photonic crystals.

Two-dimensional photonic crystals are formed, for example, by aligning holes in a thin film layer on a substrate using photolithographic techniques. A two-dimensional photonic crystal defect waveguide then is obtained by providing line defects in the array of holes.

Moreover, in case of an optical waveguide device fabricated using a waveguide of the type in which homogeneous materials such as quartz and silicon are used as core materials with a view to confine propagating light using total reflection from low refractive index claddings, practically perfect reflective surfaces, albeit with some reflection losses, can be obtained by covering the peripheral surfaces of the bottleneck portion(s) parallel to the Y-axis with a metal reflective film.

APPLICATION EXAMPLES

Application examples, in which coupled resonant devices according to the above-described embodiment are used as dispersion-compensating devices, are explained below.

Application Example 1

Figure 6:
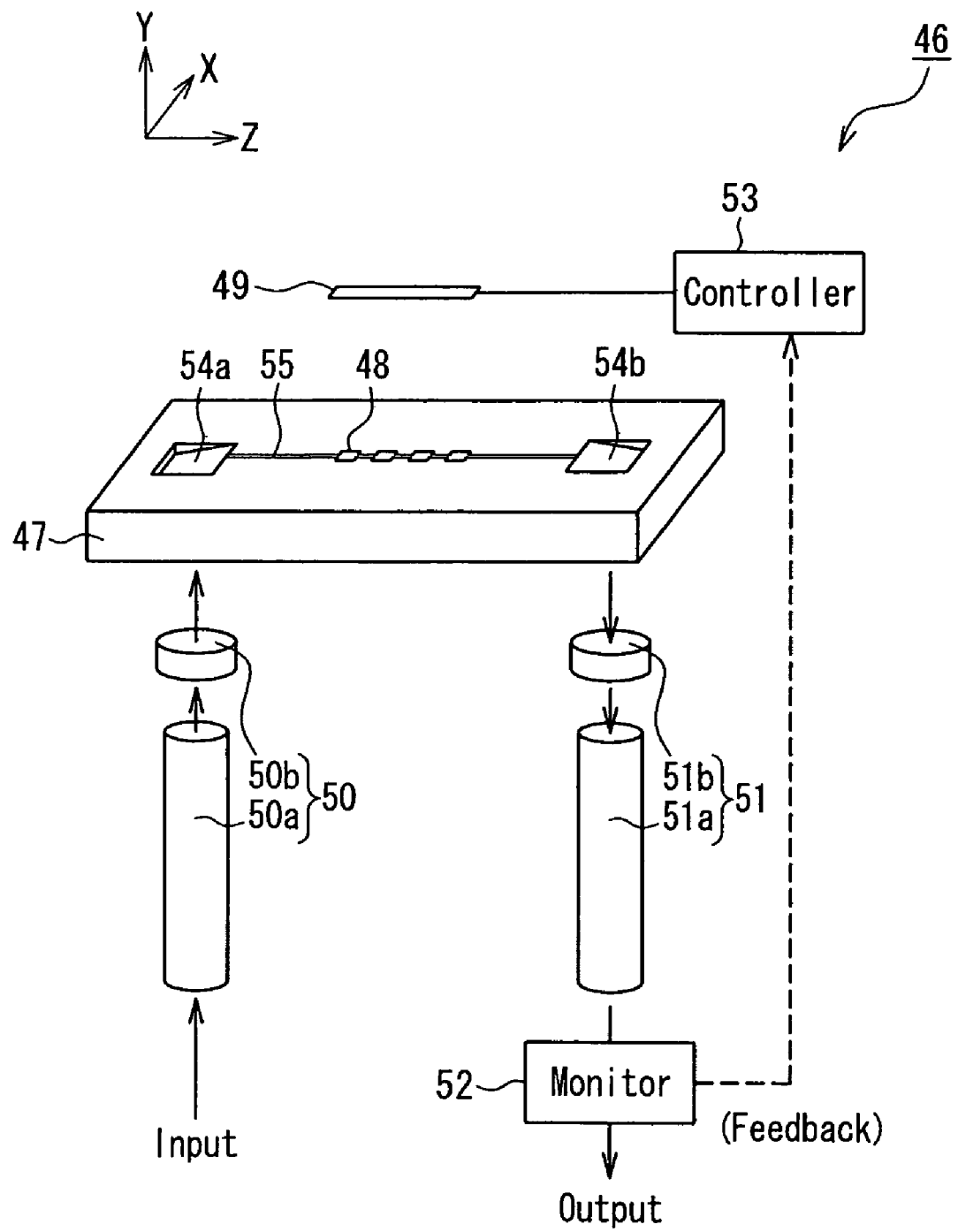
FIG. 6 is a conceptual diagram illustrating a dispersion-compensating module according to Application Example 1 of the present invention, in which a coupled resonant device is employed.

FIG. 6 is a conceptual diagram illustrating a dispersion-compensating module according to Application Example 1 of the present invention in which a coupled resonant device is employed.

As shown in FIG. 6, the dispersion-compensating module 46 of the present application example includes a dispersion-compensating device 48, which is a coupled resonant device provided on a substrate 47, a micro-heater (electric heater) 49, which is used to locally heat the dispersion-compensating device 48, a light input unit 50 used to input light into a one-dimensional photonic crystal waveguide 55 that constitutes the dispersion-compensating device 48, a light output unit 51 used to output light from the one-dimensional photonic crystal waveguide 55 that constitutes the dispersion-compensating device 48, a monitor 52, which is used to monitor output light from the light output unit 51, and a controller 53, which is used to adjust the output of the micro-heater 49 based on the monitoring results of the monitor 52. It should be noted that while the micro-heater 49 is shown as spaced away from the dispersion-compensating device 48 in FIG. 6 for better understanding, it is actually preferable for the micro-heater 49 to be in contact with the dispersion-compensating device 48.

The light input unit 50 includes an optical fiber 50a and a lens 50b, while the light output unit 51 includes an optical fiber 51a and a lens 51b. The light input unit 50, along with the light output unit 51, is arranged at the back side of the substrate 47 perpendicularly to the substrate 47.

Mirror surfaces 54a, 54b are provided on the substrate 47 at both end faces (entrance end face and exit end face) of the one-dimensional photonic crystal waveguide 55 that constitutes the dispersion-compensating device 48.

The operation of the dispersion-compensating module 46 is explained next.

Light (pulse signal) from the light input unit 50 is made perpendicularly incident upon the substrate 47 from the back side, with this light reflected by the mirror surface 54a and coupled into the one-dimensional photonic crystal waveguide 55 that constitutes the dispersion-compensating device 48. The propagating light that propagates through the one-dimensional photonic crystal waveguide 55 that constitutes the dispersion-compensating device 48 is emitted from this one-dimensional photonic crystal waveguide 55 and subsequently reflected by the mirror surface 54b and guided to the light output unit 51. The output light from the light output unit 51 is monitored by the monitor 52, with the monitoring results fed back to the controller 53. The output of the micro-heater 49 is then adjusted by the controller 53 based on the monitoring results of the monitor 52. Consequently, the dispersion-compensating device 48 is locally heated by the micro-heater 49 and the operation wavelength region is adjusted as a result of thermal expansion and changes in the refractive index of the material of the one-dimensional photonic crystal waveguide 55 that constitutes the dispersion-compensating device 48.

Application Example 2

Figure 7:
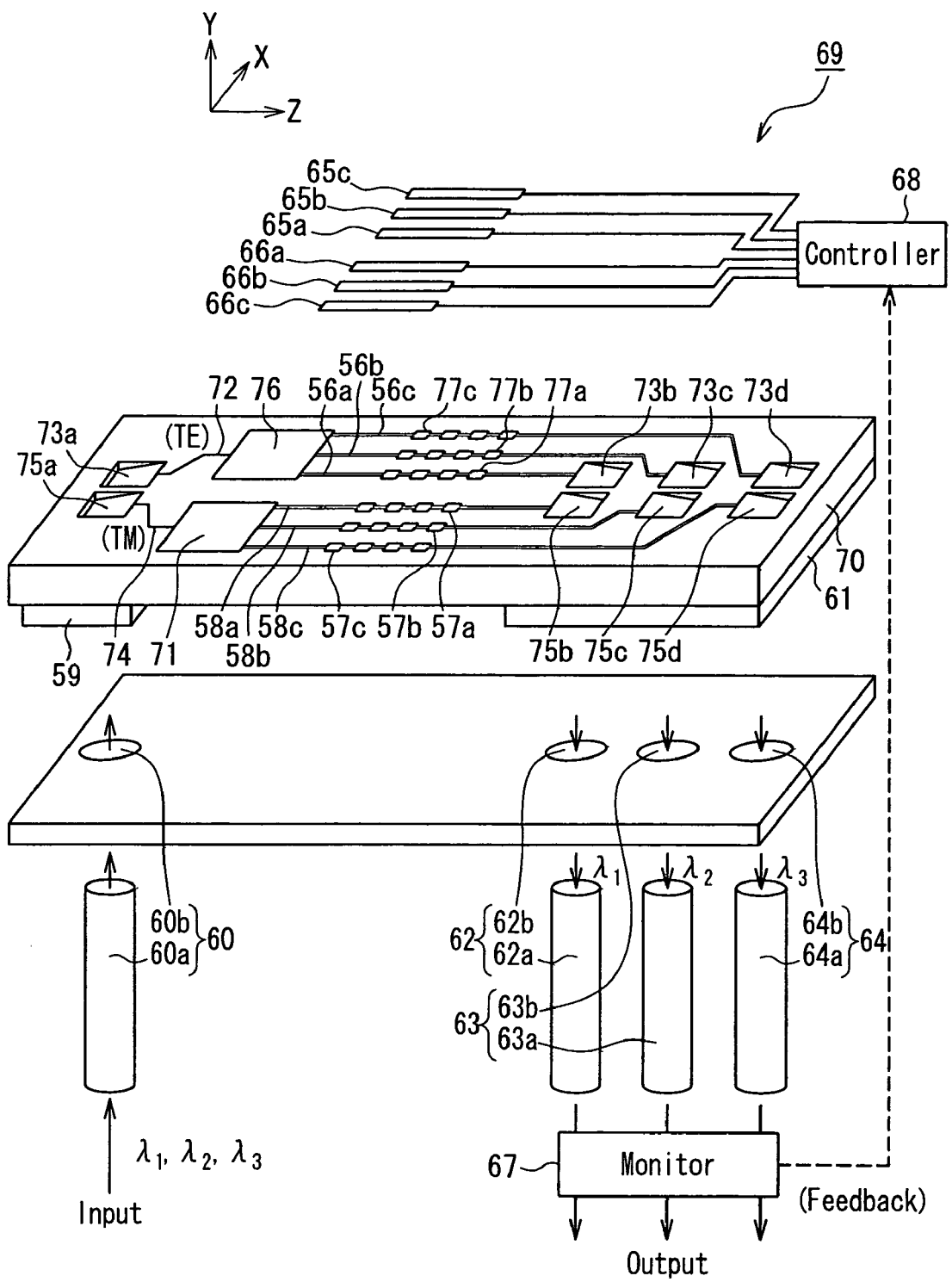
FIG. 7 is a conceptual diagram illustrating a dispersion-compensating module according to Application Example 2 of the present invention, in which a coupled resonant device is employed.

FIG. 7 is a conceptual diagram illustrating a dispersion-compensating module according to Application Example 2 of the present invention, in which a coupled resonant device is employed.

As shown in FIG. 7, the dispersion-compensating module 69 of the present application example includes a spectroscopic device 76 for TE polarized light and a spectroscopic device 71 for TM polarized light. As used herein, the term "TE polarized light" refers to polarized light whose electric field oscillates in the X-axis direction, and the term "TM polarized light" refers to polarized light whose magnetic field oscillates in the X-axis direction. A one-dimensional photonic crystal waveguide 72 provided on a substrate 70 is connected to one of the end faces of the spectroscopic device 76 for TE polarized light, with this one-dimensional photonic crystal waveguide 72 extending to mirror surface 73a for TE polarized light provided on the substrate 70. Moreover, a one-dimensional photonic crystal waveguide 74 provided on the substrate 70 is connected to one of the end faces of the spectroscopic device 71 for TM polarized light, with this one-dimensional photonic crystal waveguide 74 extending to mirror surface 75a for TM polarized light provided on the substrate 70. It should be noted that the mirror surface 73a for TE polarized light and the mirror surface 75a for TM polarized light are closely aligned in the X-axis direction.

Three dispersion-compensating devices 77a, 77b, 77c, which are coupled resonators provided on the substrate 70, are connected to the other end face of the spectroscopic device 76 for TE polarized light respectively through one-dimensional photonic crystal waveguides 56a, 56b, 56c provided on the substrate 70, with these one-dimensional photonic crystal waveguides 56a, 56b, 56c respectively extending to mirror surfaces 73b, 73c, 73d for TE polarized light provided on the substrate 70. Moreover, three dispersion-compensating devices 57a, 57b, 57c, which are coupled resonators provided on the substrate 70, are connected to the other end face of the spectroscopic device 71 for TM polarized light respectively through one-dimensional photonic crystal waveguides 58a, 58b, 58c provided on the substrate 70, with these one-dimensional photonic crystal waveguides 58a, 58b, 58c respectively extending to mirror surfaces 75b, 75c, 75d for TM polarized light provided on the substrate 70. It should be noted that the mirror surface 73b for TE polarized light and the mirror surface 75b for TM polarized light, the mirror surface 73c for TE polarized light and the mirror surface 75c for TM polarized light, as well as the mirror surface 73d for TE polarized light and the mirror surface 75d for TM polarized light respectively are closely aligned in the X-axis direction.

A birefringent plate 59 is provided on the back side of the substrate 70 facing the mirror surface 73a for TE polarized light and the mirror surface 75a for TM polarized light. Moreover, a light input unit 60, which includes an optical fiber 60a and a lens 60b, is arranged at the back side of the birefringent plate 59 perpendicularly to the birefringent plate 59.

Moreover, a birefringent plate 61 is provided on the back side of the substrate 70 facing the mirror surfaces 73b, 73c, 73d for TE polarized light and the mirror surfaces 75b, 75c, 75d for TM polarized light. Moreover, a first light output unit 62, which includes an optical fiber 62a and a lens 62b, a second light output unit 63, which includes an optical fiber 63a and a lens 63b, and a third light input unit 64, which includes an optical fiber 64a and a lens 64b, are arranged at the back side of the birefringent plate 61 perpendicularly to the birefringent plate 61.

Furthermore, the dispersion-compensating module 69 of the present application example includes micro-heaters 65a, 65b, 65c, 66a, 66b, 66c used respectively to locally heat the dispersion-compensating devices 77a, 77b, 77c, 57a, 57b, 57c, a monitor 67 used to monitor output light emanating from the first, second, and third light output units 62, 63, 64, and a controller 68 used to adjust the respective outputs of the micro-heaters 65a, 65b, 65c, 66a, 66b, 66c based on the monitoring results of the monitor 67. It should be noted that while the micro-heaters 65a, 65b, 65c, 66a, 66b, 66c are shown as spaced away from the dispersion-compensating devices 77a, 77b, 77c, 57a, 57b, 57c in FIG. 7 for better understanding, it is actually preferable for the micro-heaters 65a, 65b, 65c, 66a, 66b, 66c to be in contact with the dispersion-compensating devices 77a, 77b, 77c, 57a, 57b, 57c.

The operation of the dispersion-compensating module 69 is explained next.

A WDM (wavelength-division multiplexing) light signal from the light input unit 60, which is obtained by multiplexing light of three wavelengths, i.e. $\lambda_1$, $\lambda_2$, and $\lambda_3$, is made incident perpendicularly upon the birefringent plate 59 from the back side and is separated into TE polarized light and TM polarized light, each of which contains light of the three wavelengths $\lambda_1$, $\lambda_2$, and $\lambda_3$.

The TE polarized light is reflected by the mirror surface 73a for TE polarized light and is coupled into the one-dimensional photonic crystal waveguide 72. The propagating light that propagates through the one-dimensional photonic crystal waveguide 72 is split into TE polarized light with a wavelength of $\lambda_1$, TE polarized light with a wavelength of $\lambda_2$, and TE polarized light with a wavelength of $\lambda_3$, which respectively propagate through the one-dimensional photonic crystal waveguides 56a, 56b, 56c that constitute, respectively, the dispersion-compensating devices 77a, 77b, 77c. The propagating light that has propagated through the one-dimensional photonic crystal waveguides 56a, 56b, 56c then is emitted from these one-dimensional photonic crystal waveguides 56a, 56b, 56c and subsequently reflected by the mirror surfaces 73b, 73c, 73d for TE polarized light.

The TM polarized light is reflected by the mirror surface 75a for TM polarized light and is coupled into the one-dimensional photonic crystal waveguide 74. The propagating light that propagates through the one-dimensional photonic crystal waveguide 74 is split by the spectroscopic device 71 for TM polarized light into TM polarized light with a wavelength of $\lambda_1$, TM polarized light with a wavelength of $\lambda_2$, and TM polarized light with a wavelength of $\lambda_3$, which respectively propagate through the one-dimensional photonic crystal waveguides 58a, 58b, 58c that constitute, respectively, the dispersion-compensating devices 57a, 57b, 57c. The propagating light that has propagated through the one-dimensional photonic crystal waveguides 58a, 58b, 58c then is emitted from these one-dimensional photonic crystal waveguides 58a, 58b, 58c and subsequently respectively reflected by the mirror surfaces 75b, 75c, 75d for TM polarized light.

TE polarized light with a wavelength of $\lambda_1$ reflected by the mirror surface 73b for TE polarized light and TM polarized light with a wavelength of $\lambda_1$ reflected by the mirror surface 75b for TM polarized light are combined by the birefringent plate 61 and subsequently guided to the first light output unit 62. Moreover, TE polarized light with a wavelength of $\lambda_2$ reflected by the mirror surface 73c for TE polarized light and TM polarized light with a wavelength of $\lambda_2$ reflected by the mirror surface 75c for TM polarized light are combined by the birefringent plate 61 and subsequently guided to the second light output unit 63. Moreover, TE polarized light with a wavelength of $\lambda_3$ reflected by the mirror surface 73d for TE polarized light and TM polarized light with a wavelength of $\lambda_3$ reflected by the mirror surface 75d for TM polarized light are combined by the birefringent plate 61 and subsequently guided to the third light output unit 63.

The output light emanating from the first, second, and third light output units 62, 63, 64 is monitored by the monitor 67, with the monitoring results fed back to the controller 68. The outputs of the micro-heaters 65a, 65b, 65c, 66a, 66b, 66c then are adjusted respectively by the controller 68 based on the monitoring results of the monitor 67. Consequently, the dispersion-compensating devices 77a, 77b, 77c, 57a, 57b, 57c are respectively locally heated by the micro-heaters 65a, 65b, 65c, 66a, 66b, 66c and the operation wavelength region is adjusted as a result of thermal expansion and changes in the refractive index of the material of the one-dimensional photonic crystal waveguides 56a, 56b, 56c, 58a, 58b, 58c that constitute the dispersion-compensating devices 77a, 77b, 77c, 57a, 57b, 57c.

As described above, the dispersion-compensating module 69 illustrated in FIG. 7 can separate a WDM (wavelength-division multiplexing) light signal into wavelength channels and then perform individual dispersion compensation.

Figure 8:
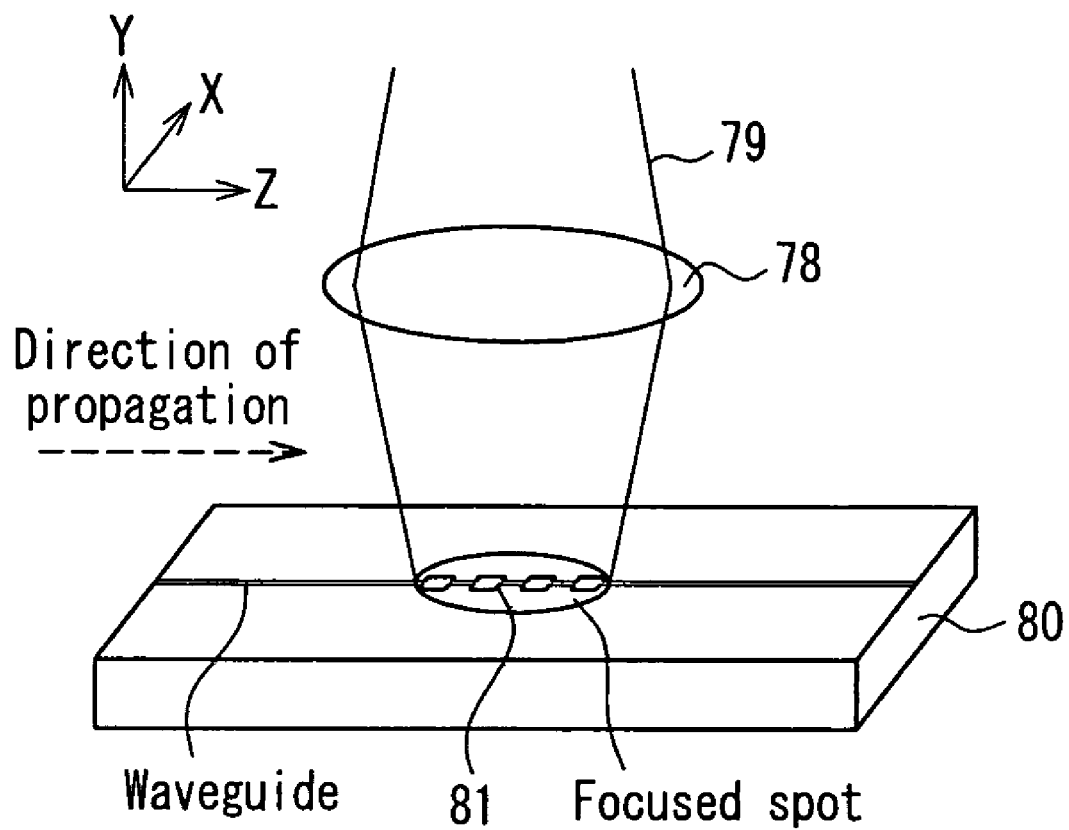
FIG. 8 is a perspective view schematically illustrating another example of temperature controller for locally varying the temperature of a dispersion-compensating device according to application examples of the present invention.

It should be noted that while the dispersion-compensating modules illustrated in FIG. 6 and FIG. 7 are adapted to adjust the operation wavelength region by heating with micro-heaters, since the dispersion-compensating device of the present application example is about the same size as a focused spot of a laser beam (several µm to several dozen µm), as shown, for example, in FIG. 8, a dispersion-compensating device 81 provided on a substrate 80 may be locally heated by focusing a laser beam 79 on (irradiating with light) this dispersion-compensating device using a condenser lens 78.

Moreover, although the present application example has been explained with reference to a case, in which local variations in the temperature of the bottleneck portions of coupled resonators utilized as a dispersion-compensating device are used to change dispersion characteristics at a specific frequency, the possibility of changing frequency characteristics by locally varying the temperature of the bottleneck portion (s) of the reflector or resonator of the above-described embodiment also is contemplated. In addition, since this permits formation of a "variable-wavelength reflectors" or a "variable-wavelength resonators", it permits switching, combining and splitting in an optical circuit for the purpose of controlling the paths traversed by specific wavelength components.

Moreover, although the present application example has been explained with reference to a case in which local variations in the temperature of the bottleneck portions are used to change their frequency characteristics, the possibility of forming the bottleneck portion(s) from substances that possess non-linear characteristics and includes rare-earth elements and quantum dots and changing their optical characteristics by external application of optical irradiation, electric fields, or magnetic fields to the bottleneck portion(s) also is contemplated. This then will permit expansion of the above-mentioned variable wavelength range.

DESIGN EXAMPLES

Design examples of the optical waveguide device explained above are illustrated below.

The characteristics of the optical waveguide device of the present invention were calculated by using electromagnetic wave analysis software ("FullWAVE" from Rsoft Design Group, Inc.) using the FDTD (Finite-Difference Time-Domain) method (below, calculations based on this method are referred to simply as "FDTD calculations").

Design Example 1

Figure 9:
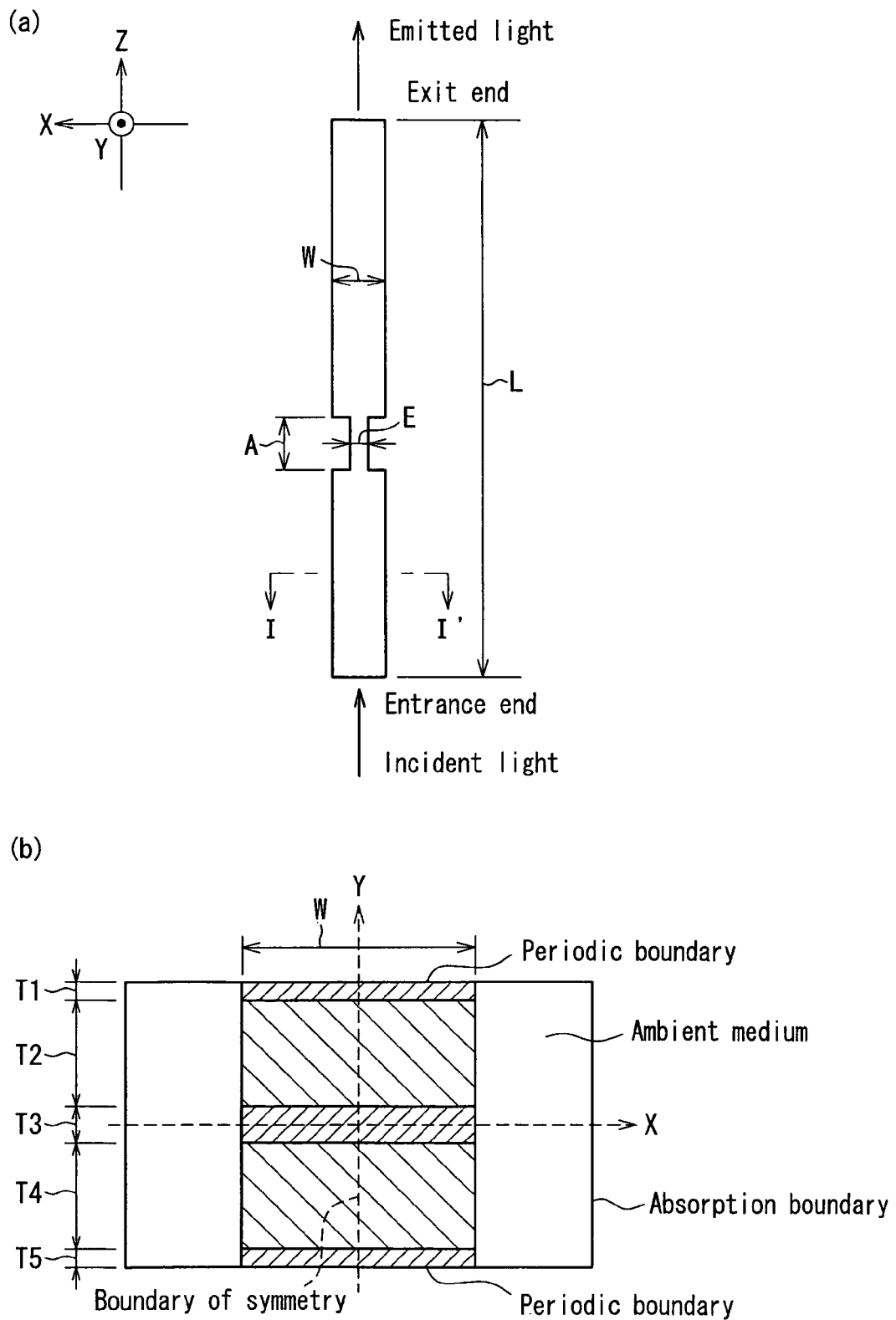
FIG. 9 is a schematic diagram illustrating an optical waveguide device (bottleneck-type reflector) used as a calculation model in Design Example 1 of the present invention, in which FIG. 9(*a*) is a plan view and FIG. 9(*b*) is a cross-sectional view taken along line I-I' in FIG. 9(*a*).

FIG. 9 is a schematic diagram illustrating an optical waveguide device (bottleneck-type reflector) used as a calculation model in Design Example 1 of the present invention, in which FIG. 9(*a*) is a plan view and FIG. 9(*b*) is a cross-sectional view taken along line I-I' in FIG. 9(*a*).

As shown in the cross-sectional view of FIG. 9(b), in the waveguide portion, the following layers are stacked in the Y-axis direction:
- refractive index 2.1, thickness T1=64.5 nm
- refractive index 1.45, thickness T2=301.0 nm
- refractive index 2.1, thickness T3=129.0 nm
- refractive index 1.45, thickness T4=301.0 nm
- refractive index 2.1, thickness T5=64.5 nm.

Since the topmost layer and lowermost layer set periodic boundary conditions, this is equivalent to an endless periodic multilayer film of two layers:
- refractive index 2.1, thickness=129.0 nm, and
- refractive index 1.45, thickness=301.0 nm (period (T2+T3): 430 nm). The width of the waveguide is W. In addition, the ambient medium is a homogeneous medium with a refractive index of 1.45. It should be noted that the YZ plane was used as the boundary of symmetry and only the right half was calculated.

In addition, in the plan view of FIG. 9(a), the width of the waveguide was denoted as W, the total length of the waveguide was denoted as L, the length of the bottleneck portion in the longitudinal direction of the waveguide (Z-axis direction) was denoted as A, and the length (width) of the waveguide in a direction (X-axis direction) transverse to the longitudinal direction (Z-axis direction) was denoted as E. Assuming that a homogeneous medium with a refractive index of n=3.0 was at the entrance end face of the waveguide, propagating light in the mode on the Brillouin zone boundary was generated by injecting two Gaussian beams of the same intensity and same phase with an incident angle of ±θ within the YZ plane towards the intersection of the X-axis and Y-axis in the cross-sectional view of FIG. 9(b). It should be noted that the Gaussian beams were of substantially uniform intensity because their width (the total width of the portion with an intensity of $1/e^2$ relative to the central portion) in the X-axis direction was 1.5 μm and the value of their width in the Y-axis direction was as large as 10 μm. Here, "e" is the base of natural logarithms (=2.718 . . . ).

Figure 10:
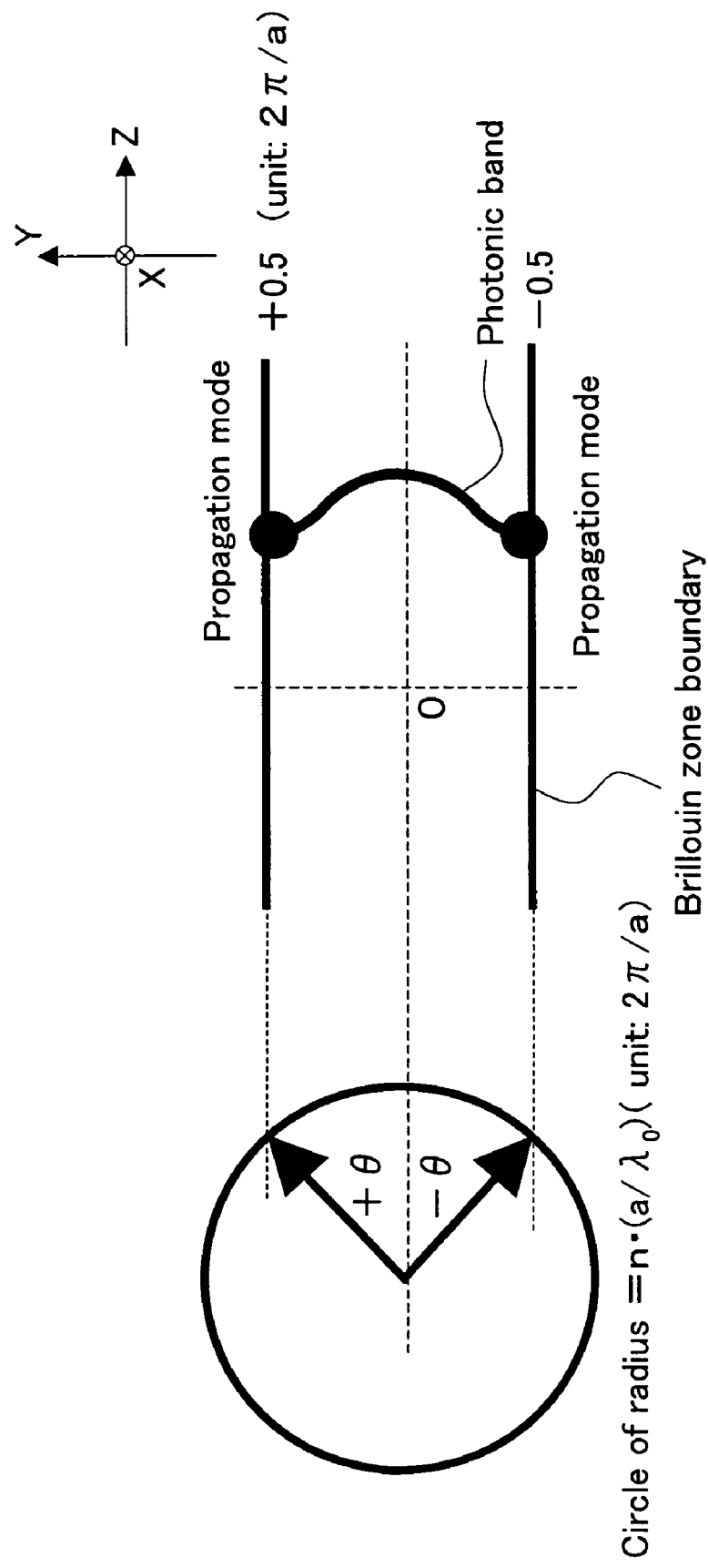
FIG. 10 is a band diagram illustrating a relationship between incident light with an incident angle of ±θ and the propagation mode on the Brillouin zone boundary according to Design Example 1 of the present invention.

FIG. 10 is a band diagram illustrating a relationship between incident light with an incident angle of ±θ and the mode on the Brillouin zone boundary. To couple the two, it is sufficient to satisfy the equation:

$$n \cdot (a/\lambda_0) \cdot \sin\theta = 0.5.$$

Here, $\lambda_0$ is the wavelength of the incident light in vacuum (unit: μm). Since here n=3.0 and a=0.43 μm, the incident angle θ is defined by the equation:

$$\sin\theta = \lambda_0/(3 \times 2 \times 0.43).$$

FDTD calculations were performed on a reflector of the shape shown in FIG. 9. The dimensions of the various portions of this reflector were:

W=1500 nm, L=4500 nm, A=1000 nm, and E=800 nm.

Figure 11:
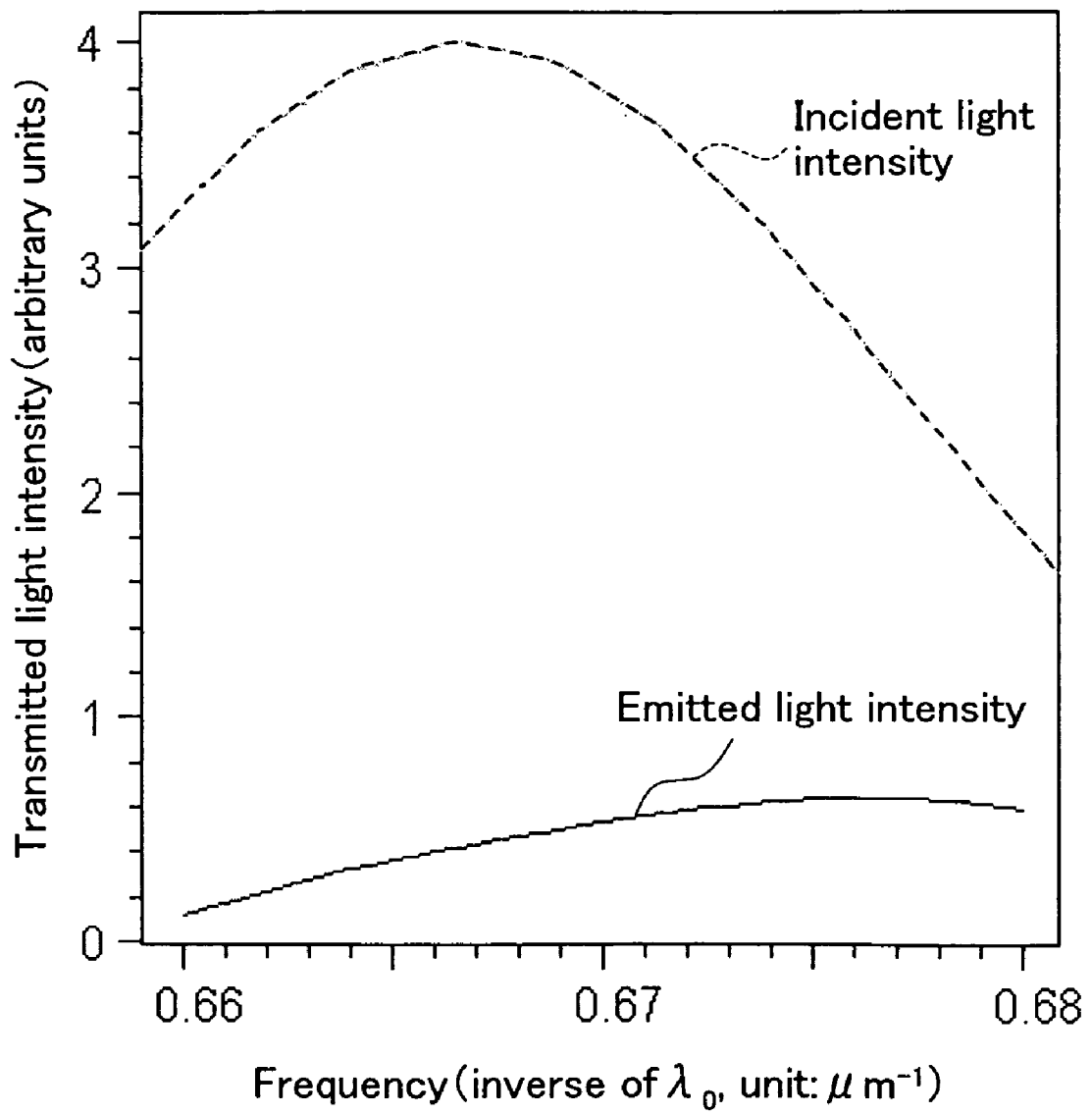
FIG. 11 is a diagram illustrating the frequency response characteristics of an optical waveguide device according to Design Example 1 of the present invention.

A Gaussian pulse with a central wavelength of $\lambda_0$=1.500 μm (the duration of the pulse, at half-width with an intensity of $1/e^2$, was $10\lambda_0/c$, where c is the velocity of light in vacuum) was launched through the entrance end of the waveguide and its time response was obtained by measurements at the exit end of the waveguide, whereupon a frequency response was obtained by Fourier-transforming the time response. The results are shown in FIG. 11. The frequency plotted along the horizontal axis of FIG. 11 is the inverse of the wavelength $\lambda_0$ in vacuum (unit: μm), with the vertical axis of FIG. 11 representing the transmitted light intensity in arbitrary units. It should be noted that the intensity distribution of the incident pulse in the frequency range also is shown in FIG. 11.

As can be seen from FIG. 11, the transmittance (obtained by dividing the emitted light intensity by the incident light intensity) remained practically unchanged over a wide wavelength region, with the bottleneck-type reflector operating as an optical device of small frequency selectivity.

Design Example 2

Figure 12:
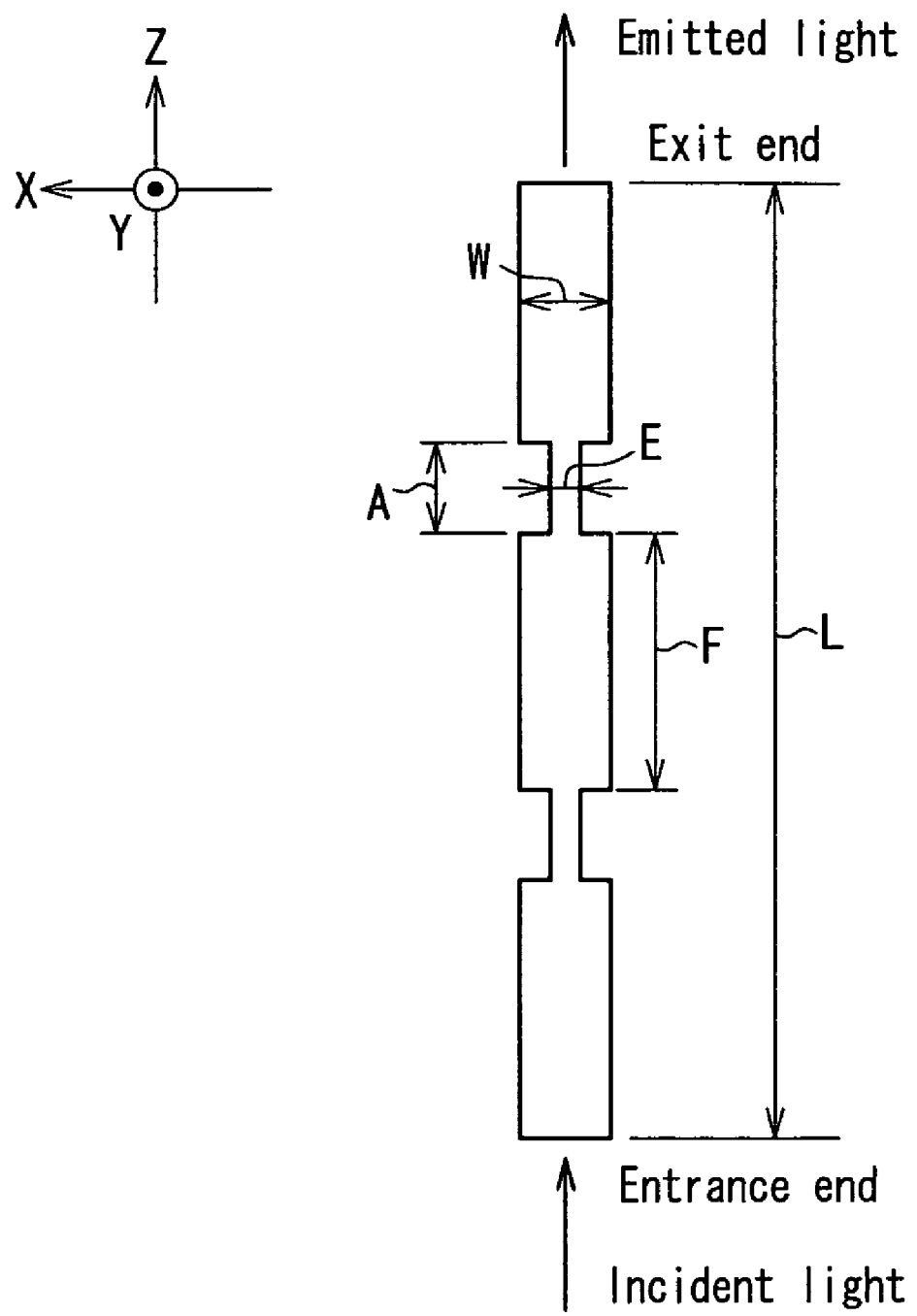
FIG. 12 is a plan view schematically illustrating an optical waveguide device (bottleneck-type resonator) used as a calculation model in Design Example 2 of the present invention.

FIG. 12 is a plan view schematically illustrating an optical waveguide device (bottleneck-type resonator) used as a calculation model. It should be noted that, in FIG. 12, F is the length of the portion (resonator) sandwiched between the bottleneck portions in the longitudinal direction of the waveguide (Z-axis direction).

FDTD calculations were performed on a resonator of the shape shown in FIG. 12. The dimensions of the various portions of this resonant device were:

W=1500 nm, L=7000 nm, A=1000 nm, E=500 nm, and F=1400 nm.

Figure 13:
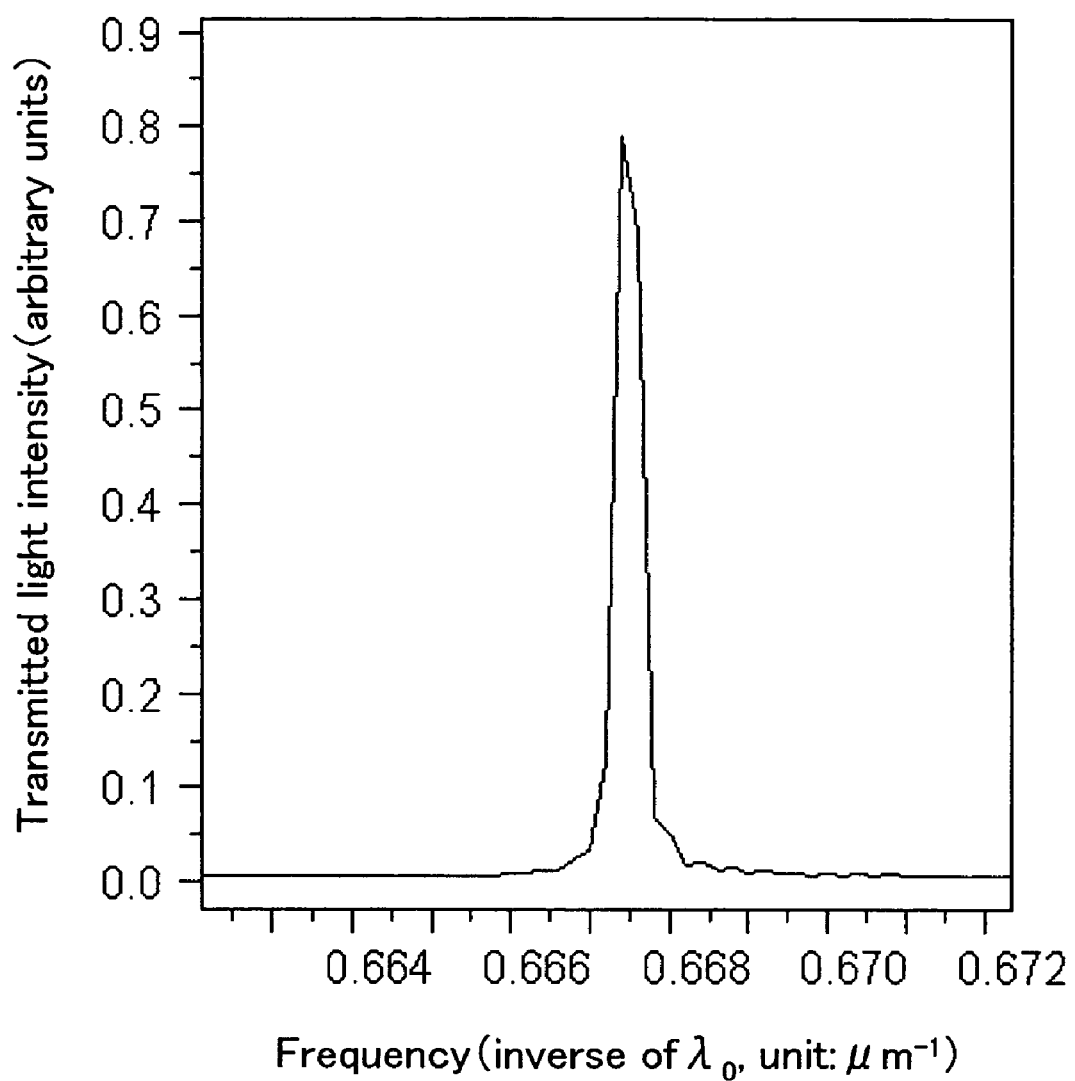
FIG. 13 is a diagram illustrating the frequency response characteristics of an optical waveguide device according to Design Example 2 of the present invention.

A Gaussian pulse with a central wavelength of $\lambda_0$=1.49611 μm (the duration of the pulse, at half-width with an intensity of $1/e^2$, was $10\lambda_0/c$, where c is the velocity of light in vacuum) was launched through the entrance end of the waveguide and its time response was obtained by measurements at the exit end face of the waveguide, whereupon a frequency response was obtained by Fourier-transforming the time response. The results are shown in FIG. 13. The frequency plotted along the horizontal axis of FIG. 13 is the inverse of the wavelength $\lambda_0$ in vacuum (unit: μm), with the vertical axis of FIG. 13 representing the transmitted light intensity in arbitrary units.

As can be seen from FIG. 13, a resonance peak appeared at a frequency of 0.6674 (unit: 1 μm), with the device operating as a Fabry-Perot resonator.

Design Example 3

Figure 14:
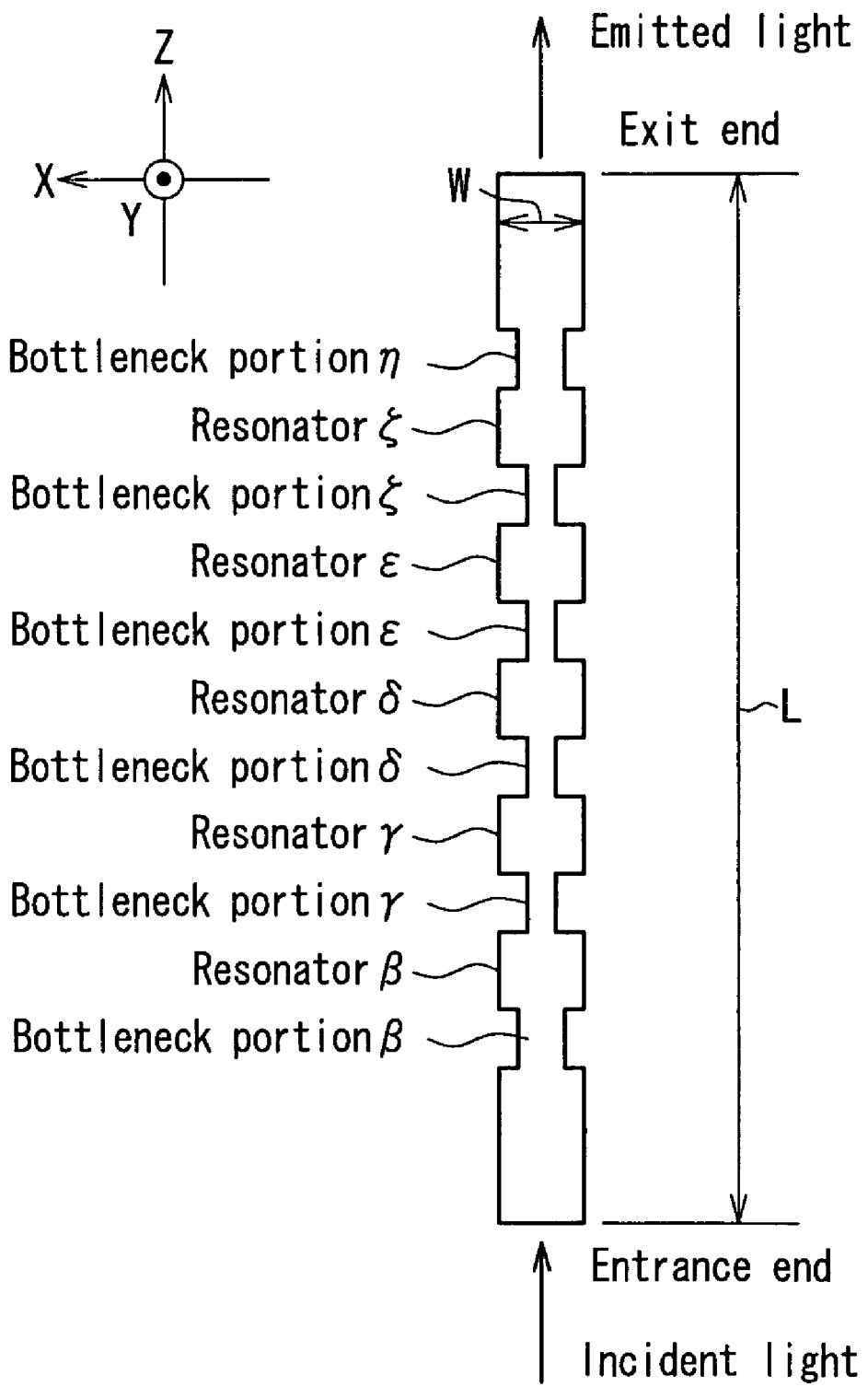
FIG. 14 is a plan view schematically illustrating an optical waveguide device (bottleneck-type coupled resonator) used as a calculation model in Design Example 3 of the present invention.

FIG. 14 is a plan view schematically illustrating an optical waveguide device (bottleneck-type coupled resonant device) used as a calculation model. Its difference from the optical waveguide device illustrated in FIG. 12 is that the bottleneck portions are provided in a periodic fashion.

FDTD calculations were performed on a coupled resonant device of the shape shown in FIG. 14. The dimensions of the various portions of this coupled resonant device were as follows.

W=1500 nm, L=15000 nm.

The bottleneck portions and resonators, arranged from the entrance side in turn, were as follows:
- bottleneck portion β: A=1000 nm, E=1050 nm,
- resonator β: F=870 nm,
- bottleneck portion γ: A=1000 nm, E=750 nm,
- resonator γ: F=1220 nm,
- bottleneck portion δ: A=1000 nm, E=600 nm,
- resonator δ: F=1290 nm,
- bottleneck portion ∈: A=1000 nm, E=600 nm,
- resonator ∈: F=1220 nm,
- bottleneck portion ζ: A=1000 nm, E=750 nm,
- resonator ζ: F=870 nm,
- bottleneck portion η: A=1000 nm, E=1050 nm.

Here, the definitions of the lengths A, E, and F are the same as in FIG. 12. It should be noted that the sizes of the bottleneck portions and resonators are not the same, which is the result of optimization performed in order to ensure constant transmittance in the transmission band.

Figure 15:
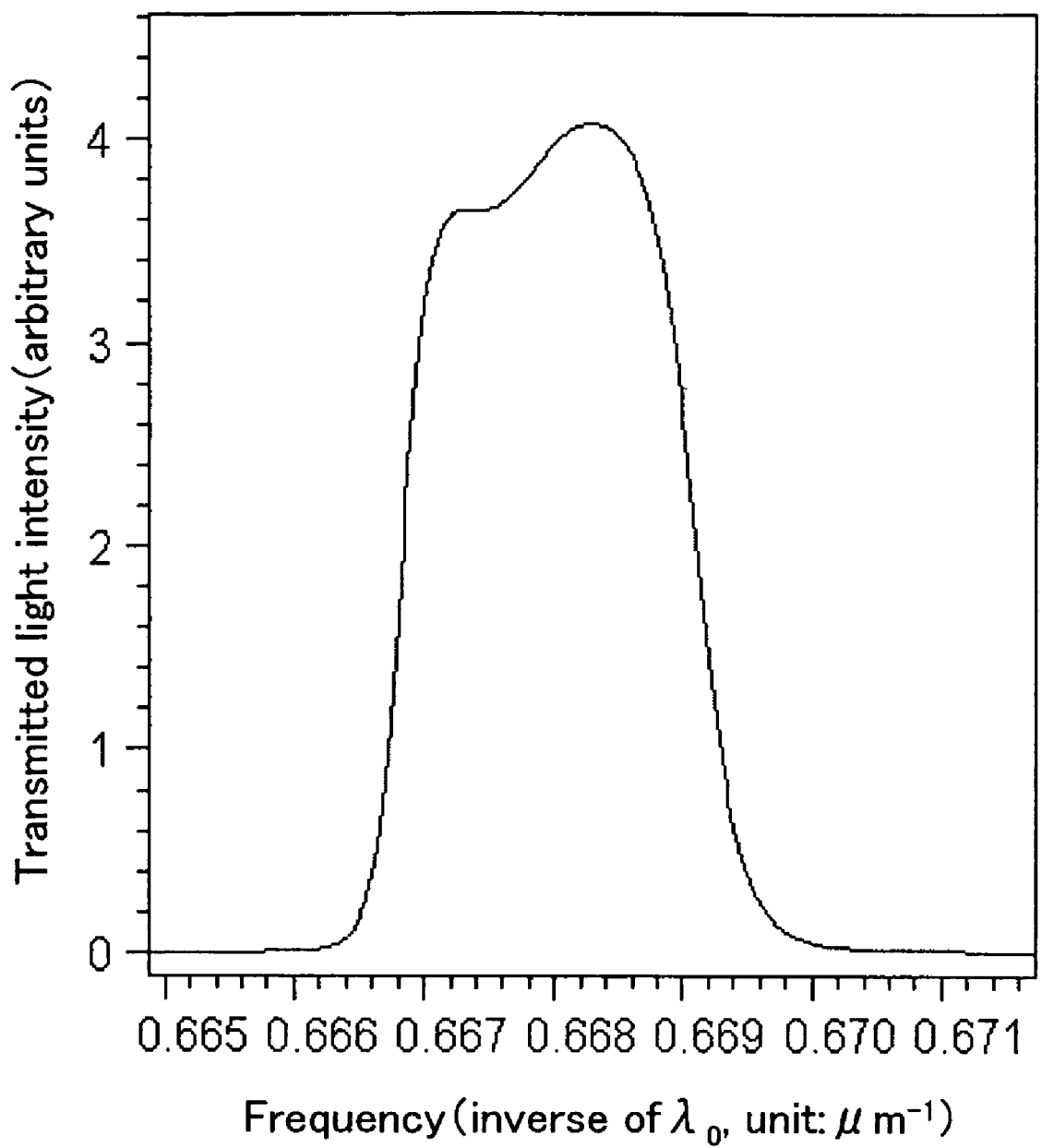
FIG. 15 is a diagram illustrating the frequency response characteristics of an optical waveguide device according to Design Example 3 of the present invention.

A Gaussian pulse with a central wavelength of $\lambda_0$=1.49611 μm (the duration of the pulse, at half-width with an intensity of $1/e^2$, was $10\lambda_0/c$, where c is the velocity of light in vacuum) was launched through the entrance end of the waveguide and its time response was obtained by measurements at the exit end face of the waveguide, whereupon a frequency response was obtained by Fourier-transforming the time response. The results are shown in FIG. 15. The frequency plotted along the horizontal axis of FIG. 15 is the inverse of the wavelength $\lambda_0$ in vacuum (unit: μm), with the vertical axis of FIG. 15 representing the transmitted light intensity in arbitrary units.

As can be seen from FIG. 15, a nearly constant transmittance was obtained over the 0.667-0.669 frequency range (unit: 1/μm).

INDUSTRIAL APPLICABILITY

In accordance with the present invention, a coupled resonant device can be provided in a waveguide. Therefore, the present invention can be used as a dispersion-compensating module, etc.

The invention claimed is:

1. An optical waveguide device comprising:
   a linear waveguide; and
   an at least one bottleneck portion formed by locally narrowing the width of the waveguide,
   wherein the waveguide has a core that is composed of a one-dimensional photonic crystal exhibiting refractive index periodicity in one direction and permits propagation of electro-magnetic waves in directions that do not exhibit the refractive index periodicity.

2. The optical waveguide device according to claim 1, wherein only one bottleneck portion is provided in a single location in the longitudinal direction of the waveguide.

3. The optical waveguide device according to claim 1, wherein electro-magnetic waves are partially reflected by the at least one bottleneck portion.

4. The optical waveguide device according to claim 1, wherein more than one of the at least one bottleneck portions are provided in at least two locations in the longitudinal direction of the waveguide, with electro-magnetic waves of specific frequency components resonated therebetween.

5. The optical waveguide device according to claim 1, wherein more than one of the at least one bottleneck portions are provided in a periodic fashion in the longitudinal direction of the waveguide.

6. The optical waveguide device according to claim 1, wherein a reflective layer covers the at least one bottleneck portion.

7. The optical waveguide device according to claim 1, wherein frequency characteristics are changed by locally varying temperature of the at least one bottleneck portion.

8. The optical waveguide device according to claim 7, further comprising a temperature controller for varying the temperature of the at least one bottleneck portion by heating with heaters or optical irradiation.

9. The optical waveguide device according to claim 1, wherein the at least one bottleneck portion is composed of substances possessing non-linear characteristics and its optical characteristics are changed by external application of optical irradiation, electric fields, or magnetic fields to the at least one bottleneck portion.

10. The optical waveguide device according to claim 1, wherein the core,
    along with being made up of a multilayer film provided on a substrate and exhibiting refractive index periodicity across the thickness of the substrate, allows electro-magnetic waves to propagate by using the photonic band present on a Brillouin zone boundary in a direction perpendicular to the direction exhibiting the refractive index periodicity, and
    satisfies the condition:

$$a/\lambda_0 < 1/(2n_s),$$

where $n_s$ is the refractive index of a medium in contact with the side surfaces of the core that are parallel to the direction of the refractive index periodicity, a is the refractive index period of the core, and $\lambda_0$ is the wavelength, in vacuum, of the electro-magnetic waves propagating through the core.

* * * * *